(12) United States Patent
Hahn et al.

(10) Patent No.: US 12,218,758 B2
(45) Date of Patent: Feb. 4, 2025

(54) METHOD AND DEVICE FOR RESERVATION OF SIDELINK RESOURCE IN COMMUNICATION SYSTEM

(71) Applicants: Hyundai Motor Company, Seoul (KR); Kia Corporation, Seoul (KR)

(72) Inventors: Gene Back Hahn, Gyeonggi-do (KR); In Yong Jung, Gyeonggi-do (KR); Hyukmin Son, Jeollabuk-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 277 days.

(21) Appl. No.: 17/636,599

(22) PCT Filed: Aug. 20, 2020

(86) PCT No.: PCT/KR2020/011106
§ 371 (c)(1),
(2) Date: Feb. 18, 2022

(87) PCT Pub. No.: WO2021/034124
PCT Pub. Date: Feb. 25, 2021

(65) Prior Publication Data
US 2022/0303059 A1    Sep. 22, 2022

Related U.S. Application Data

(60) Provisional application No. 62/913,932, filed on Oct. 11, 2019, provisional application No. 62/889,847, filed on Aug. 21, 2019.

(30) Foreign Application Priority Data

Aug. 12, 2020 (KR) .................... 10-2020-0101180

(51) Int. Cl.
*H04L 1/1812* (2023.01)
*H04W 72/20* (2023.01)
*H04W 92/18* (2009.01)

(52) U.S. Cl.
CPC .......... *H04L 1/1812* (2013.01); *H04W 72/20* (2023.01); *H04W 92/18* (2013.01)

(58) Field of Classification Search
CPC ................. H04L 1/1812; H04L 1/1887; H04L 1/1893; H04L 1/1896; H04L 5/001; H04L 5/0048;
(Continued)

(56) References Cited

U.S. PATENT DOCUMENTS 11,296,850 B2 * 4/2022 Yeo .................... H04L 27/2602
11,356,979 B2 * 6/2022 He ........................ H04W 72/02
(Continued)

OTHER PUBLICATIONS

R1-1904689—"Design and Contents of PSCCH and PSFCH", 3GPP TSG RAN WG1 Meeting #96bil, Ci'an, China, (Apr. 8-12, 2019).
(Continued)

*Primary Examiner* — Brian T O'Connor
(74) *Attorney, Agent, or Firm* — Fox Rothschild LLP

(57) ABSTRACT

A method and a device for reservation of a sidelink resource in a communication system are disclosed. An operation method of a transmission terminal comprises the steps of: generating an SCI #n including resource allocation information about a PSSCH #n and resource allocation information about a PSSCH #n+k; transmitting the SCI #n to a reception terminal in the PSCCH #n; transmitting data #n to the reception terminal in the PSSCH #n indicated by the SCI #n; and receiving, from the reception terminal, a HARQ response to the data #n.

15 Claims, 18 Drawing Sheets

(58) Field of Classification Search
CPC ... H04L 5/005; H04L 5/0051; H04L 27/0006; H04L 5/0044; H04L 5/0053; H04L 5/0094; H04W 72/20; H04W 92/18; H04W 72/02; H04W 72/0446; H04W 72/0453; H04W 72/1263; H04W 4/70; H04W 76/14; H04W 4/40; H04W 72/53
See application file for complete search history.

(56) References Cited

U.S. PATENT DOCUMENTS

| | | | | |
|---|---|---|---|---|
| 11,546,095 | B2* | 1/2023 | Kim | H04W 72/1263 |
| 11,916,680 | B2* | 2/2024 | Ye | H04L 1/1825 |
| 11,943,168 | B2* | 3/2024 | Yeo | H04W 72/569 |
| 12,047,312 | B2* | 7/2024 | Chen | H04W 4/40 |
| 12,047,953 | B2* | 7/2024 | Chen | H04L 5/0053 |
| 12,075,416 | B2* | 8/2024 | Hwang | H04L 5/0053 |
| 2022/0140964 | A1* | 5/2022 | Chen | H04L 5/0048 370/330 |
| 2022/0191875 | A1* | 6/2022 | Panteleev | H04W 72/0446 |
| 2022/0217697 | A1* | 7/2022 | Lee | H04W 72/20 |
| 2022/0225292 | A1* | 7/2022 | Mohammad Soleymani | H04W 84/005 |
| 2022/0225313 | A1* | 7/2022 | Kalhan | H04W 72/044 |
| 2022/0255680 | A1* | 8/2022 | Moon | H04L 5/0055 |
| 2024/0008004 | A1* | 1/2024 | He | H04W 4/46 |

OTHER PUBLICATIONS

R1-1908911, "PHY Layer Structure for NR Sidelink", 3GPP TSG-RAN WG1 Meeting #98, Prague, CZ, (Aug. 26-30, 2019).
R1-1909015, "Sidelink Physical Layer Structure", 3GPP TSG-RAN WG1 #98, Prague, CZ (Aug. 26-30, 2019).
R1-1909254, "Sidelink Resource Allocation Mechanism for NR V2X", 3GPP TSG RAN WG1 #98, Prague, CZ (Aug. 26-30, 2019).
R1-1909305, "Discussion on Sidelink Structure in NR V2X", 3GPP TSG RAN W61 #98, Prague, CZ (Aug. 26-30, 2019).
International Search Report issued on Nov. 13, 2020 in corresponding PCT Application No. PCT/KR2020/011106.
R1-1908900, "Discussion on physical layer structure for NR sidelink", 3GPP TSG RAN WG1 #98, Prague, CZ, Aug. 26-30, 2019, 34 pages.

* cited by examiner

METHOD AND DEVICE FOR RESERVATION OF SIDELINK RESOURCE IN COMMUNICATION SYSTEM

CROSS-REFERENCE TO RELATED APPLICATIONS

This application is a U.S. National Stage of International Patent Application No. PCT/KR2020/011106, filed on Aug. 20, 2020 in the Korean Intellectual Property Office. International Patent Application No. PCT/KR2020/011106 claims the benefit of U.S. Provisional Patent Application No. 62/889,847, filed on Aug. 21, 2019 and U.S. Provisional Patent Application No. 62/913,932, filed on Oct. 11, 2019. The entire contents of each of these applications are incorporated herein by reference.

BACKGROUND

Technical Field

Embodiments of the present disclosure relate to a sidelink communication technique, and more particularly, to a technique for reserving sidelink resources in a communication system.

Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

4G communication systems and 5G communication systems can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, a terminal may perform a sensing operation on a sidelink resource, and when it is determined that the sidelink resource is in an idle state by performing the sensing operation, the terminal may perform communication using the sidelink resource. On the other hand, when the sidelink resource is determined to be in a busy state, the terminal may not be able to perform communication using the sidelink resource. In order to solve the-above described problem, a method for reserving a sidelink resource and a communication method using the reserved sidelink resource are required.

SUMMARY

An objective of embodiments of the present disclosure is to provide a method and an apparatus for reserving sidelink resources in a communication system. A method of operating a transmitting terminal, according to a first exemplary embodiment of the present disclosure, may comprise: generating a sidelink control information (SCI) #n including resource allocation information of a physical sidelink shared channel (PSSCH) #n and resource allocation information of a PSSCH #n+k; transmitting the SCI #n to a receiving terminal on a physical sidelink control channel (PSCCH) #n; transmitting data #n to the receiving terminal on the PSSCH #n indicated by the SCI #n; and receiving a hybrid automatic repeat request (HARQ) response for the data #n from the receiving terminal, wherein each of n and k is a natural number.

When the HARQ response indicates acknowledgement (ACK), and there is no data #n+k to be transmitted to the receiving terminal, sidelink communication may not be performed on the PSSCH #n+k indicated by the SCI #n.

The method may further comprise, when the HARQ response indicates ACK and there is no data #n+k to be transmitted to the receiving terminal, transmitting, to the receiving terminal, an SCI #n+k including information indicating release of the PSSCH #n+k on a PSCCH #n+k.

The method may further comprise, when the HARQ response indicates ACK, and there is data #n+k to be transmitted to the receiving terminal, transmitting, to the receiving terminal, an SCI #n+k including one or more information elements required for decoding of the data #n+k on a PSCCH #n+k; and transmitting, to the receiving terminal, the data #n+k on the PSSCH #n+k indicated by the SCI #n, wherein one information element among the one or more information elements indicates that the data #n+k is new data.

The method may further comprise, when HARQ response indicates negative ACK (NACK), transmitting, to the receiving terminal, an SCI #n+k including one or more information elements required for decoding of the data #n on a PSCCH #n+k; and retransmitting, to the receiving terminal, the data #n on the PSSCH #n+k indicated by the SCI #n, wherein one information element among the one or more information elements indicates that the data #n is retransmission data.

The method may further comprise, when HARQ response indicates NACK, and there is data #n+k to be transmitted to the receiving terminal, selecting data having a higher priority among the data #n and the data #n+k; transmitting, to the receiving terminal, an SCI #n+k including one or more information elements required for decoding of the selected data on a PSCCH #n+k; and transmitting, to the receiving terminal, the selected data on the PSSCH #n+k indicated by the SCI #n.

A method of operating a transmitting terminal, according to a second exemplary embodiment of the present disclosure may comprise: generating a 1st-stage sidelink control information (SCI) #n including resource allocation information

1 for transmission of a 2nd-stage SCI #n, resource allocation information #2 for transmission of data #n, and resource allocation information #3 for transmission of another signal; transmitting, to a receiving terminal, the 1st-stage SCI #n on a physical sidelink control channel (PSCCH) #n; transmitting, to the receiving terminal, the 2nd-stage SCI #n in resources indicated by the resource allocation information #1; and transmitting, to the receiving terminal, the data #n on a physical sidelink shared channel (PSSCH) #n indicated by the resource allocation information #2, wherein n is a natural number.

The operation method may further comprise receiving, from a base station, a higher layer message including an information element indicating a type of the another signal, wherein the information element included in the higher layer message indicates that the another signal is a 1st-stage SCI #n+k, a 2nd-stage SCI #n+k, a single SCI, or data #n+k, and k is a natural number.

The resource allocation information #1 may indicate an SCI occasion in which the 2nd-stage SCI #n is transmittable or resources in which the 2nd-stage SCI #n is transmitted within the SCI occasion.

The resource allocation information #3 may indicate an offset between resources in which the 2nd-stage SCI #n is transmitted and resources in which the another signal is transmitted.

The offset may be at least one of a time offset or a frequency offset, the time offset may be set in units of symbols or slots, and the frequency offset may be set in units of subcarriers or physical resource blocks (PRBs).

An offset between resources in which the 2nd-stage SCI #n is transmitted and resources in which the another signal is transmitted may be indicated by a higher layer message received from the base station, and the resource allocation information #3 may indicate whether to apply the offset.

When the another signal to be transmitted in resources indicated by the resource allocation information #3 does not exist, the 2nd-stage SCI #n may include an information element indicating release of the resources indicated by the resource allocation information #3.

The 1st-stage SCI #n, the 2nd-stage SCI #n, and the data #n may be transmitted in a same resource region, and the 2nd-stage SCI #n and the data #n may be multiplexed in the PSSCH #n belonging to the same resource region.

A resource region #1 in which the 1st-stage SCI #n is transmitted may be configured differently from a resource region #2 in which the 2nd-stage SCI #n and the data #n are transmitted, and the 2nd-stage SCI #n and the data #n may be multiplexed in the PSSCH #n belonging to the resource region #2.

A method of operating a receiving terminal, according to a third exemplary embodiment of the present disclosure for achieving the objective, may comprise: receiving, from a transmitting terminal, an 1st-stage sidelink control information (SCI) #n in an SCI occasion, the 1st-stage SCI #n including resource allocation information #1 for transmission of a 2nd-stage SCI #n, resource allocation information #2 for transmission of data #n, and resource allocation information #3 for transmission of another signal; receiving, from the transmitting terminal, the 2nd-stage SCI #n in resources indicated by the resource allocation information #1; and receiving, from the transmitting terminal, the data #n on a physical sidelink shared channel (PSSCH) #n indicated by the resource allocation information #2, wherein n is a natural number.

The 1st-stage SCI #n may be received by performing a blind decoding operation, and the 2nd-stage step SCI #n may be received without performing a blind decoding operation.

The operation method may further comprise receiving, from the base station, a higher layer message including an information element indicating a type of the another signal, wherein the information element included in the higher layer message indicates that the another signal is a 1st-stage SCI #n+k, a 2nd-stage SCI #n+k, single SCI, or data #n+k, and k is a natural number.

When the another signal to be transmitted in resources indicated by the resource allocation information #3 does not exist, the 2nd-stage SCI #n may include an information element indicating release of the resources indicated by the resource allocation information #3.

The resource allocation information #3 may indicate an offset between resources in which the 2nd-stage SCI #n is transmitted and resources in which the another signal is transmitted, the offset may be at least one of a time offset or a frequency offset, the time offset may be set in units of symbols or slots, and the frequency offset may be set in units of subcarriers or physical resource blocks (PRBs).

According to embodiments of the present disclosure, sidelink control information (SCI) may be used to reserve one or more resource regions (e.g., physical sidelink control channel (PSCCH) or physical sidelink shared channel (PSSCH)). The terminal(s) may perform sidelink communication using the one or more resource regions reserved by the SCI. Accordingly, the sidelink communication can be efficiently performed. When there is no signal (e.g., data) to be transmitted through the resource region reserved by the SCI, the reserved resource region may be released. Therefore, the sidelink resource can be used efficiently.

DETAILED DESCRIPTION

Figure 1:
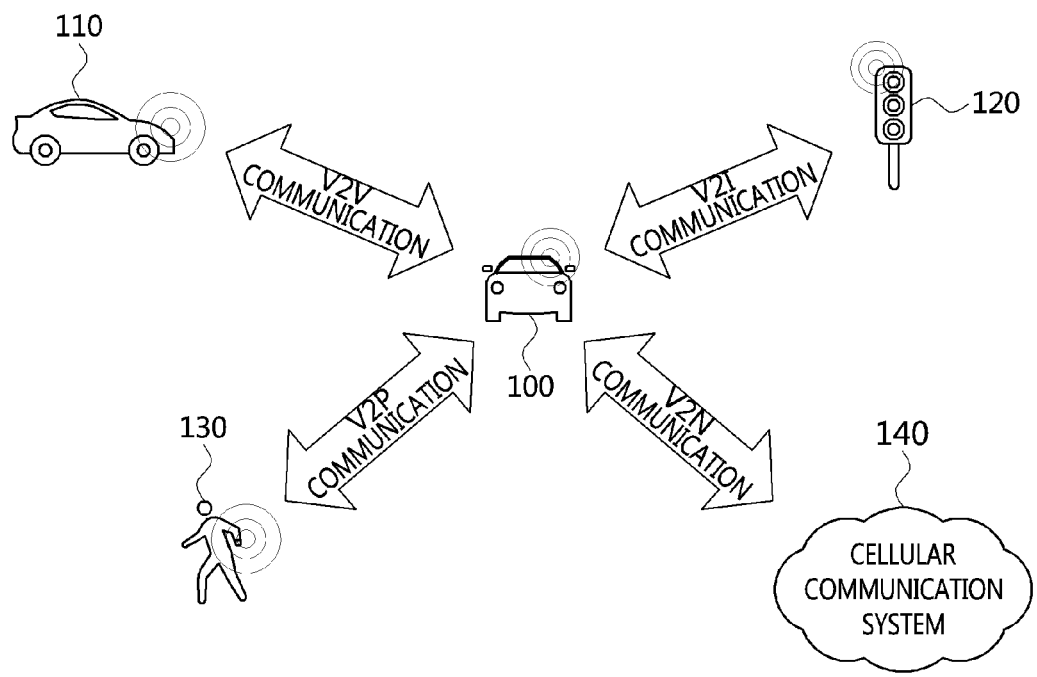
FIG. 1 is a conceptual diagram illustrating V2X communication scenarios.

While embodiments of the present invention are susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the disclosed embodiments, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100, or the communication node carried by the person 130, may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., 5G new radio (NR)). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
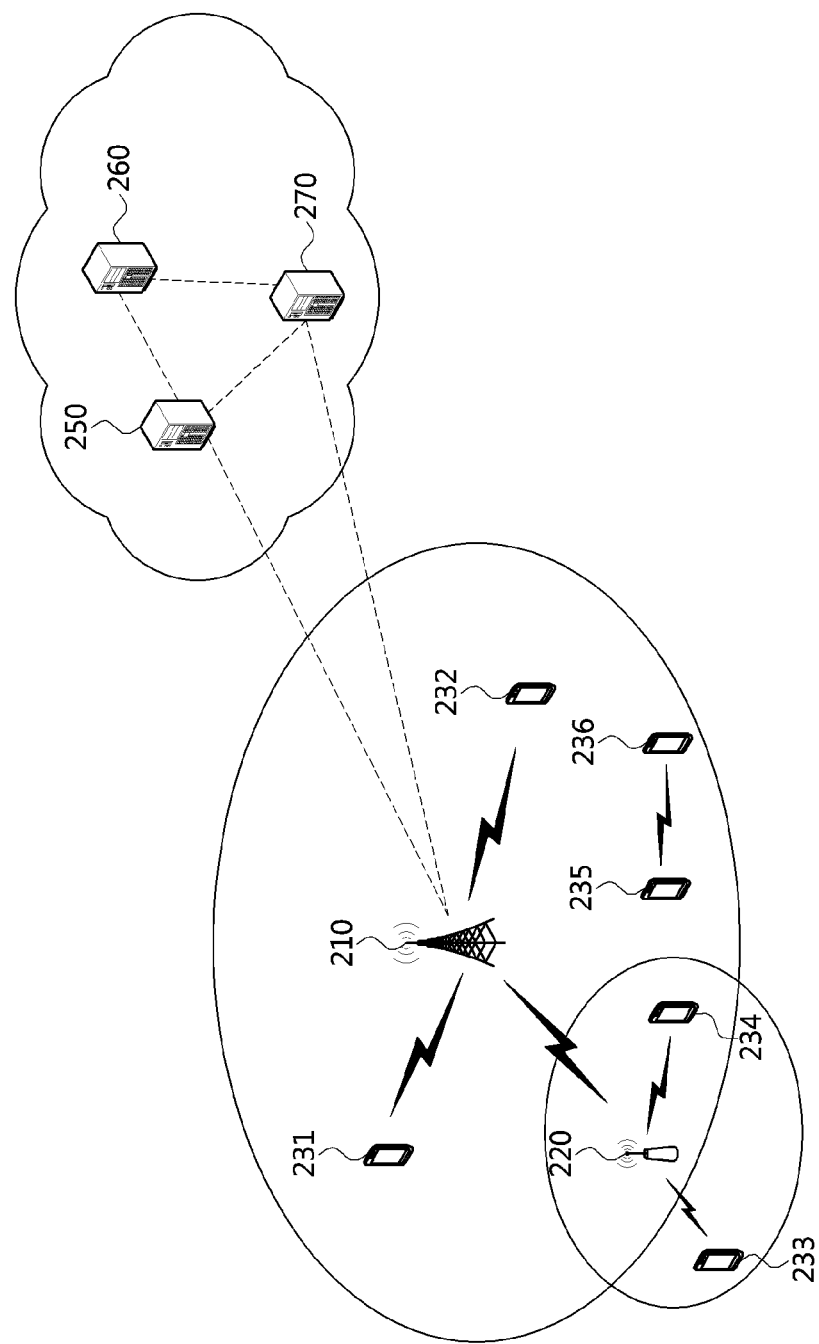
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
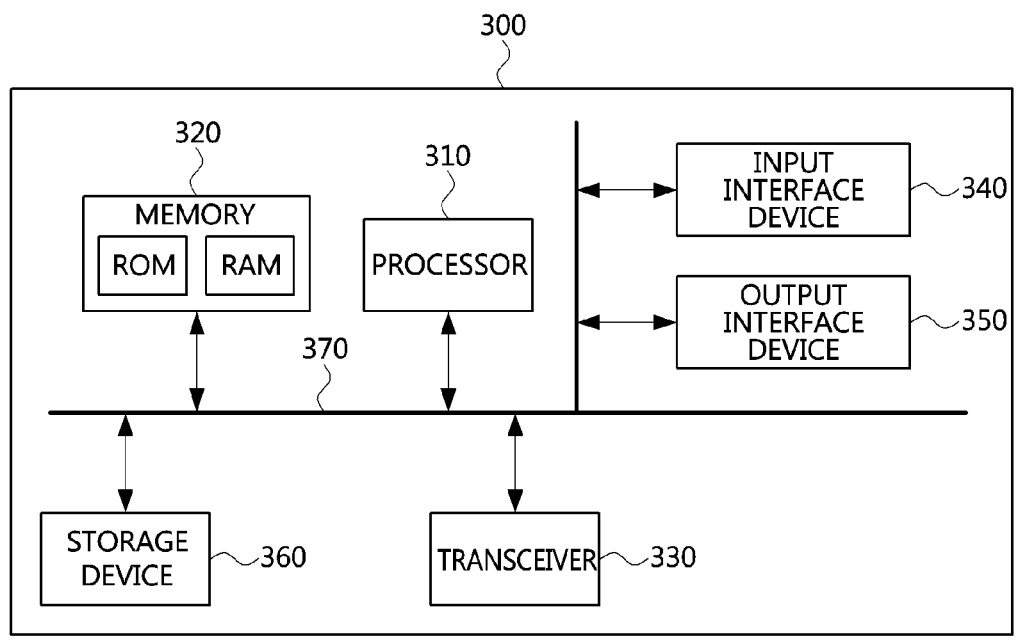
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
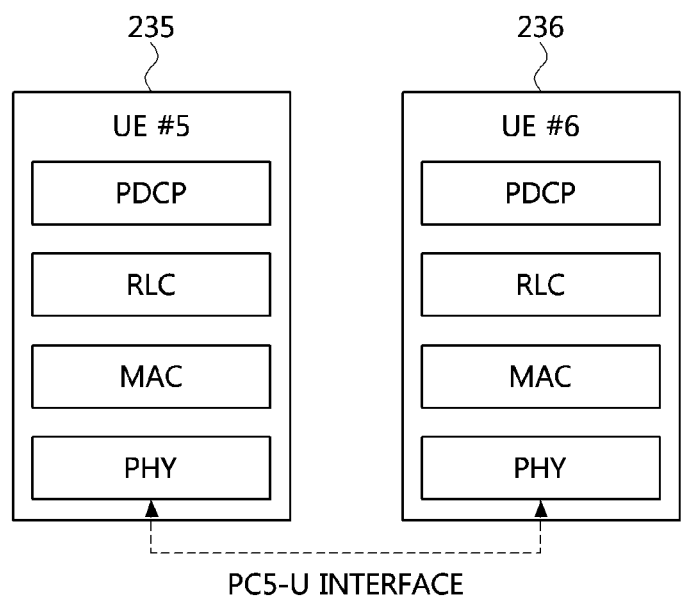
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
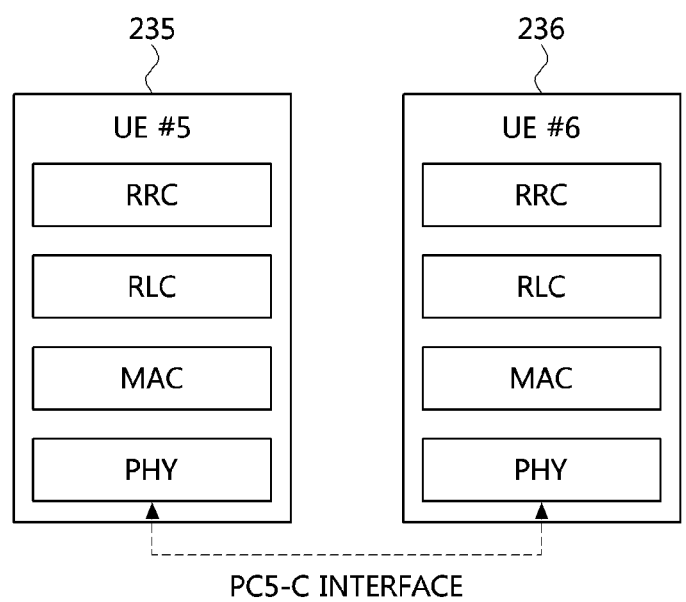
FIG. 5 is a block diagram illustrating a first exemplary embodiment of a control plane protocol stack of a UE performing sidelink communication.
Figure 6:
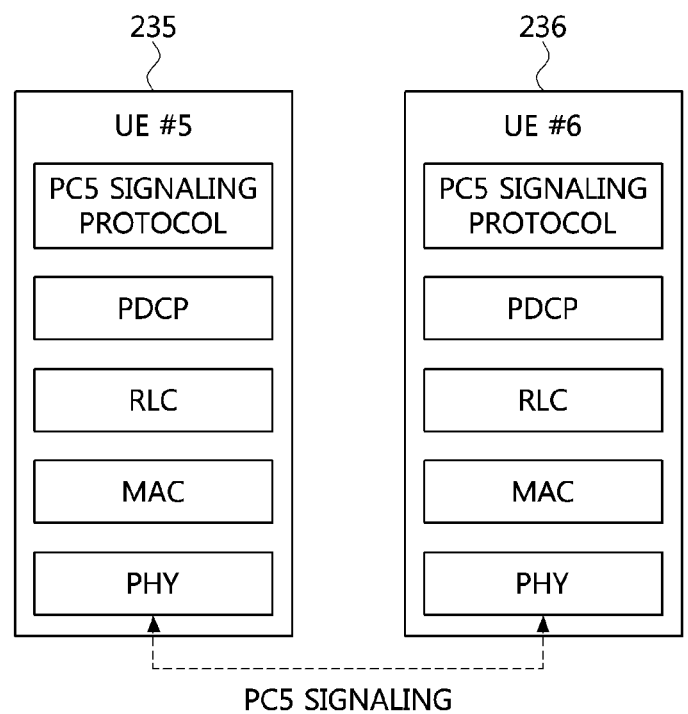
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |

TABLE 2-continued

| Sidelink TM | Description |
| --- | --- |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for configuring sidelink resources will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a "higher layer message" or "higher layer signaling message." A message used for MAC signaling may be referred to as a "MAC message" or "MAC signaling message." A message used for PHY signaling may be referred to as a "PHY message" or "PHY signaling message." The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

In exemplary embodiments, sidelink communication methods between a transmitting terminal and a receiving terminal will be described. The transmitting terminal may refer to a terminal transmitting data (e.g., sidelink data), and the receiving terminal may refer to a terminal receiving the data.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as a "first-stage SCI," and the 2nd-stage SCI may be referred to as a "second-stage SCI."

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

When the single-SCI scheme is used, the SCI may be transmitted in one or more resource elements (REs) within a PSCCH occasion. The PSCCH occasion may be a resource region in which the SCI can be transmitted. One or more REs in which the SCI is transmitted within the PSCCH occasion may configure a PSCCH. The PSCCH occasion may be referred to as an "SCI occasion."

When the multi-SCI scheme is used, the 1st-stage SCI may be transmitted in one or more REs within the PSCCH occasion, and the 2nd-stage SCI may be transmitted in one or more REs within a PSSCH occasion. The PSSCH occasion may be a resource region in which the 2nd-stage SCI can be transmitted. The PSSCH occasion may be configured independently of the PSCCH occasion. Alternatively, the 2nd-stage SCI may be transmitted in one or more REs within the PSCCH occasion instead of the PSSCH occasion. In this case, the PSCCH occasion may include one or more REs used for transmission of the 1st-stage SCI and one or more REs used for transmission of the 2nd-stage SCI. The PSCCH occasion may be referred to as a "1st-stage SCI occasion," and the PSSCH occasion may be referred to as a "2nd-stage SCI occasion." The SCI occasion may include the 1st-stage SCI occasion and the 2nd-stage SCI occasion.

Figure 7:
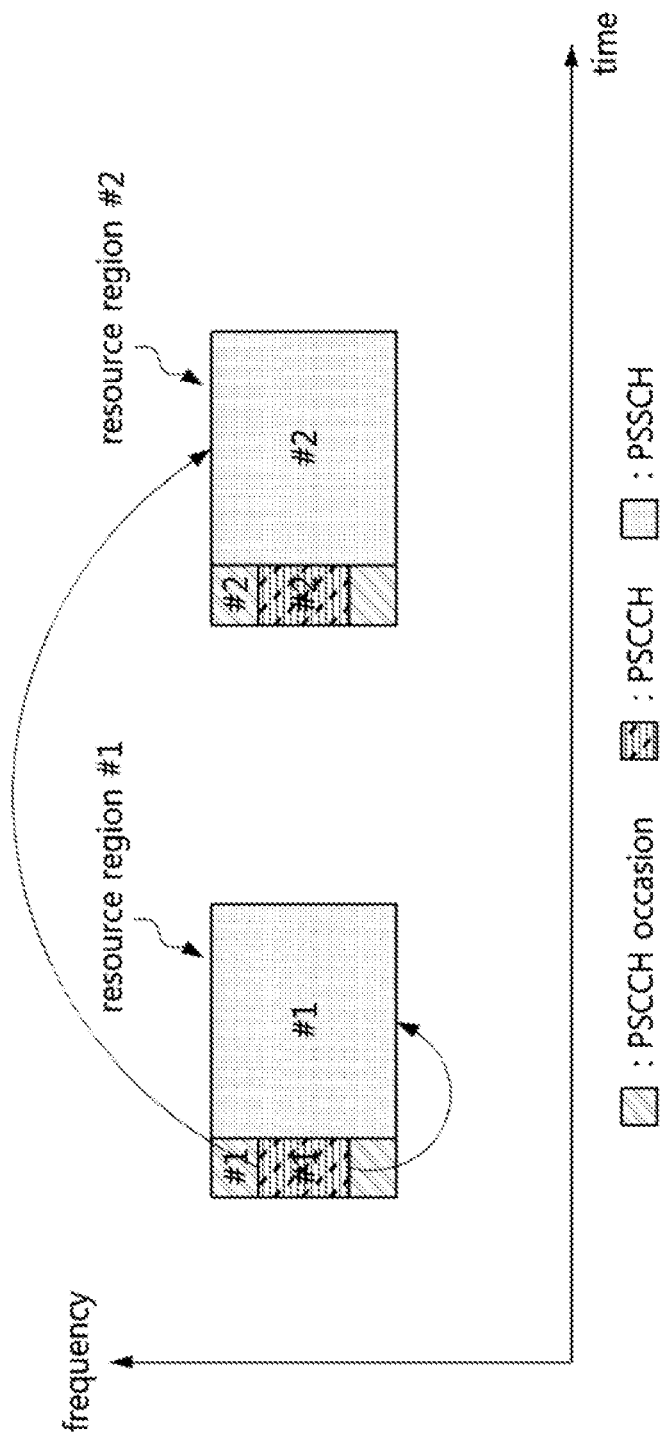
FIG. 7 is a conceptual diagram illustrating a first exemplary embodiment of a method for reserving sidelink resources in a communication system.

FIG. 7 is a conceptual diagram illustrating a first exemplary embodiment of a method for reserving sidelink resources in a communication system. As shown in FIG. 7, one resource region (e.g., resource pool, slot, or subframe) may include a PSCCH occasion and a PSSCH. The PSCCH occasion may be configured in the entire frequency region in x symbols within a resource region. x may be a natural number. Some resources within the resource region may be configured as the PSCCH occasion. The position of the PSCCH occasion within the resource region may be variously configured. For example, in the time domain, the PSCCH occasion may be located in the front part of the resource region.

A transmitting terminal may generate an SCI #1 including resource allocation information, and may transmit the SCI #1 in resources within the PSCCH occasion #1. The resource allocation information may be used for reservation (e.g., configuration) of sidelink resources. The resource allocation information may include at least one of resource allocation information of a PSSCH #1, resource allocation information of a PSCCH occasion #2, resource allocation information of a PSCCH #2, resource allocation information of a PSSCH #2, resource allocation information of a resource region #2 (e.g., resource region including the PSCCH occasion #2 and the PSSCH #2), or combinations thereof.

The resource allocation information may include time resource allocation information and/or frequency resource allocation information. The time resource allocation information may be one or a combination of two or more of the number of symbols, symbol index(es), the number of slots, slot index(es), the number of subframes, subframe index(es), a time offset, and a duration. The time resource(s) may be indicated by a combination of a start symbol index and an end symbol index, a combination of a start symbol index and the number of symbols (e.g., duration), a combination of a start slot index and an end slot index, or a combination of a start slot index and the number of slots (e.g., duration).

The frequency resource allocation information may be one or a combination of two or more of the number of REs, RE index(es), the number of subcarriers, subcarrier index(es), the number of physical resource blocks (PRBs), PRB index(es), the number of subchannels, subchannel index(es), the number of RB sets, and RB set index(s). The frequency resource(s) may be indicated by a combination of a start RE index and an end RE index, a combination of a start RE index and the number of REs, a combination of a start PRB index and an end PRB index, or a combination of a start PRB index and the number of PRBs. The start RE may be an RE having the highest frequency among REs constituting the frequency resource(s), and the end RE may be an RE having the lowest frequency among the REs constituting the frequency resource(s). Here, an RE may mean a subcarrier. The start PRB may be a PRB having the highest frequency among PRBs constituting the frequency resource(s), and the end PRB may be a PRB having the lowest frequency among the PRBs constituting the frequency resource(s).

The SCI #1 associated with the PSSCH #1 may be used to reserve resources required for transmission of next data. The "SCI #1 associated with the PSSCH #1" may be the "SCI #1 including scheduling information of data transmitted on the PSSCH #1." The SCI #1 may include resource allocation information of resources required for transmission of the next data. The resources required for transmission of the next data may be one or more of the PSCCH occasion #2, the PSCCH #2, the PSSCH #2, and the resource region #2. A short term reservation message may be used instead of the SCI #1 in order to reserve required resources. In this case, the short term reservation message may include the above-described resource allocation information (e.g., resource allocation information included in the SCI #1).

An SCI #n transmitted on a PSCCH #n may be used to reserve one or more of a PSCCH #n+k, a PSCCH occasion #n+k, a PSSCH #n+k, and a resource region #n+k. The resource region #n+k may include the PSCCH occasions #n+k and the PSSCH #n+k. Each of n and k may be a natural number. If the PSCCH #n+k (or PSCCH occasion #n+k) is not reserved by the SCI #n, an SCI #n+k may be transmitted within the PSSCH #n+k reserved by the SCI #n.

Figure 8:
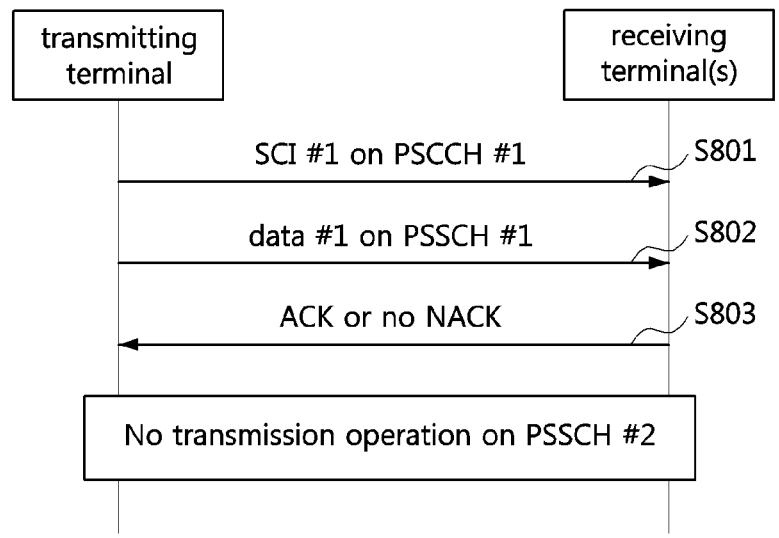
FIG. 8 is a sequence chart illustrating a first exemplary embodiment of a sidelink communication method according to the exemplary embodiment shown in FIG. 7.

FIG. 8 is a sequence chart illustrating a first exemplary embodiment of a sidelink communication method according to the exemplary embodiment shown in FIG. 7.

As shown in FIG. 8, a communication system may include a base station, a transmitting terminal, and a receiving terminal(s). The base station may be the base station 210 shown in FIG. 2, the transmitting terminal may be the UE 235 shown in FIG. 2, and the receiving terminal may be the UE 236 shown in FIG. 2. The transmitting terminal and/or the receiving terminal may be located within the coverage of the base station. Alternatively, the transmitting terminal and/or the receiving terminal may be located outside the coverage of the base station. Each of the base station, the transmitting terminal, and the receiving terminal may be configured identically or similarly to the communication node 300 shown in FIG. 3. The transmitting terminal and/or the receiving terminal may support the protocol stacks shown in FIGS. 4 to 6.

The transmitting terminal may generate an SCI #1 including resource allocation information of the PSCCH #1 and resource allocation information of a PSSCH #2, and may transmit the SCI #1 to the receiving terminal(s) on a PSCCH #1 (e.g., 1st-stage SCI occasion) (S801). In addition, the SCI #1 may include information element(s) required for decoding of data #1 transmitted on the PSSCH #1. The transmitting terminal may transmit the data #1 to the receiving terminal(s) on the PSSCH #1 indicated by the resource allocation information included in the SCI #1 (S802). The receiving terminal(s) may receive the SCI #1 by performing a monitoring operation (e.g., blind decoding operation) on the PSCCH occasion #1, and may identify information element(s) (e.g., resource allocation information) included in the SCI #1.

The receiving terminal(s) may perform a reception operation for the data #1 on the PSSCH #1 indicated by the resource allocation information included in the SCI #1. When the data #1 is successfully received and an acknowledgement (ACK)/negative ACK (NACK) feedback scheme is used, the receiving terminal(s) may transmit ACK for the data #1 to the transmitting terminal (S803). Alternatively, when the data #1 is successfully received and a NACK-only feedback scheme is used, the receiving terminal(s) may not transmit NACK for the data #1 to the transmitting terminal (S803).

In exemplary embodiments, "data is successfully received" may mean "decoding of the data is successful." When the ACK/NACK feedback scheme is used, if data is successfully received, ACK may be transmitted as a HARQ response for the data, and if reception of the data fails, NACK may be transmitted as a HARQ response for the data. When the NACK-only feedback scheme is used, when data is successfully received, ACK or NACK for the data may not be transmitted, and when reception of the data fails, NACK may be transmitted as a HARQ response for the data. "Reception of data fails" may mean "decoding of the data fails."

The PSSCH #2 reserved by the SCI #1 may be used for a retransmission operation of the data #1 or an initial transmission operation of new data. When the data #1 is successfully received by the receiving terminal(s) and there is no new data in the transmitting terminal, sidelink communication may not be performed on the PSSCH #2. That is, no signal may be transmitted on the PSSCH #2. When the data #1 is successfully received and an SCI #2 is not received on the PSCCH #2, the receiving terminal(s) may determine that new data is not to be transmitted on the PSSCH #2, and may not perform a reception operation of new data on the PSSCH #2. Here, the SCI #2 may include information element(s) required for decoding of the new data.

Figure 9:
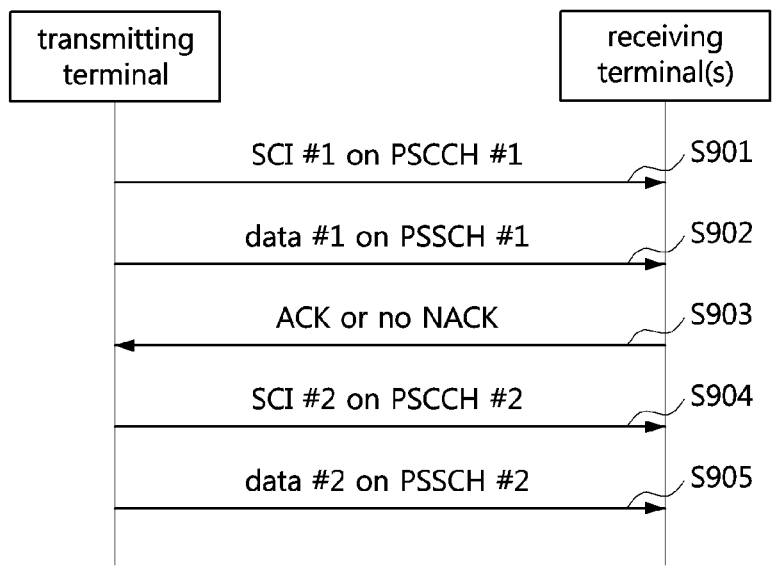
FIG. 9 is a sequence chart illustrating a second exemplary embodiment of a sidelink communication method according to the exemplary embodiment shown in FIG. 7.

FIG. 9 is a sequence chart illustrating a second exemplary embodiment of a sidelink communication method according to the exemplary embodiment shown in FIG. 7. A transmitting terminal and a receiving terminal(s) shown in FIG. 9 may be the same as the transmitting terminal and the receiving terminal(s) shown in FIG. 8. Steps S901 to S903 may be performed in the same manner as the steps S801 to S803 shown in FIG. 8. When the step S903 is completed and new data (e.g., data #2) exists, the transmitting terminal may generate an SCI #2 including information element(s) required for decoding of the data #2, and may transmit the SCI #2 to the receiving terminal(s) on a PSCCH #2 (S904). In addition, the SCI #2 may further include resource allocation information of a PSSCH #3 located after the PSSCH #2. The SCI #2 may further include an information element (e.g., new data indicator (NDI)) indicating that the data #2 scheduled by the SCI #2 is new data. "The data #2 is new data" may be indicated by an explicit scheme, an implicit scheme, or a combination of an explicit scheme and an implicit scheme.

The receiving terminal(s) may receive the SCI #2 by performing a monitoring operation on a PSCCH occasion #2, and may identify information element(s) included in the SCI #2. The PSCCH occasion #2 may be indicated by one or a combination of two or more of higher layer signaling, MAC signaling, and PHY signaling (e.g., SCI #1). The receiving terminal(s) may perform a reception operation for the data #2 by using the information element(s) included in the SCI #2 on the PSSCH #2 indicated by the SCI #1.

Figure 10:
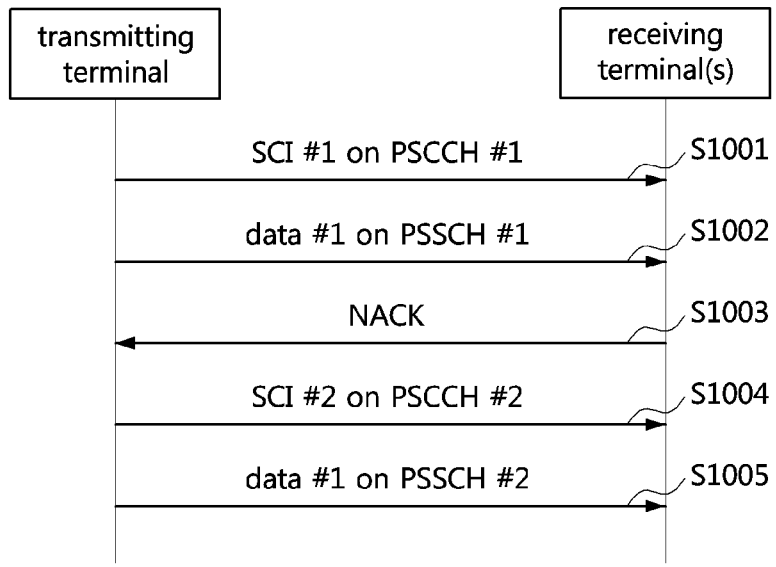
FIG. 10 is a sequence chart illustrating a third exemplary embodiment of a sidelink communication method according to the exemplary embodiment shown in FIG. 7.

FIG. 10 is a sequence chart illustrating a third exemplary embodiment of a sidelink communication method according to the exemplary embodiment shown in FIG. 7. A transmitting terminal and a receiving terminal(s) shown in FIG. 10 may be the same as the transmitting terminal and the receiving terminal(s) shown in FIG. 8. Steps S1001 to S1002 may be performed in the same manner as the steps S801 to S802 shown in FIG. 8. The receiving terminal(s) may fail to receive data #1. In this case, the receiving terminal(s) may transmit NACK for the data #1 to the transmitting terminal (S1003). When the NACK for the data #1 is received, the transmitting terminal may determine that the data #1 has not been received by the receiving terminal(s). Accordingly, the transmitting terminal may determine that a retransmission operation of the data #1 is required.

In addition, new data to be transmitted to the receiving terminal(s) (e.g., data #2) may exist in the transmitting terminal. In this case, the transmitting terminal may compare a priority of a retransmission operation of the data #1 with a priority of an initial transmission operation of the data #2. When the priority of the retransmission operation of the data #1 is higher than the priority of the initial transmission operation of the data #2, the transmitting terminal may generate the SCI #2 including information element(s) required for decoding of the data #1. The transmitting terminal may transmit the SCI #2 to the receiving terminal(s) on a PSCCH #2 (S1004). In addition, the SCI #2 may further include resource allocation information of a PSSCH #3 located after the PSSCH #2. The SCI #2 may further include an information element (e.g., NDI) indicating that the data #1 scheduled by the SCI #2 is retransmission data. "The data #1 is retransmission data" may be indicated by an explicit scheme, an implicit scheme, or a combination of an explicit scheme and an implicit scheme.

The receiving terminal(s) may receive the SCI #2 by performing a monitoring operation on a PSCCH occasion #2, and may identify information element(s) included in the SCI #2. The PSCCH occasion #2 may be indicated by one or a combination of two or more of higher layer signaling, MAC signaling, and PHY signaling (e.g., SCI #1). The receiving terminal(s) may perform a reception operation for the data #1 on the PSSCH #2 indicated by the SCI #1 by using the information element(s) included in the SCI #2.

Alternatively, when the priority of the retransmission operation of the data #1 is lower than the priority of the initial transmission operation of data #2, the transmitting terminal may generate the SCI #2 including information element(s) required for decoding of the data #2. The transmitting terminal may transmit the SCI #2 on the PSCCH #2 to the receiving terminal(s) (S1004). In addition, the SCI #2 may further include resource allocation information of a PSSCH #3 located after the PSSCH #2. The SCI #2 may further include an information element (e.g., NDI) indicating that the data #2 scheduled by the SCI #2 is initial transmission data. "The data #2 is initial transmission data" may be indicated by an explicit scheme, an implicit scheme, or a combination of an explicit scheme and an implicit scheme.

The receiving terminal(s) may receive the SCI #2 by performing a monitoring operation on the PSCCH occasion #2, and may identify the information element(s) included in the SCI #2. The receiving terminal(s) may perform a reception operation for the data #2 on the PSSCH #2 indicated by the SCI #1 by using the information element(s) included in the SCI #2.

Figure 11:
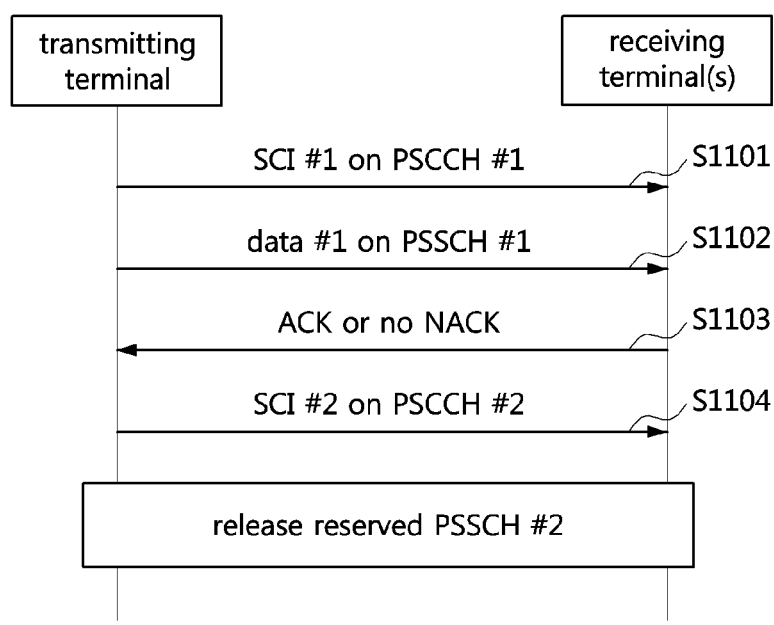
FIG. 11 is a sequence chart illustrating a fourth exemplary embodiment of a sidelink communication method according to the exemplary embodiment shown in FIG. 7.

FIG. 11 is a sequence chart illustrating a fourth exemplary embodiment of a sidelink communication method according to the exemplary embodiment shown in FIG. 7. A transmitting terminal and a receiving terminal(s) shown in FIG. 11 may be the same as the transmitting terminal and the receiving terminal(s) shown in FIG. 8. Steps S1101 to S1103 may be performed in the same manner as the steps S801 to S803 shown in FIG. 8. When the step S1103 is completed and new data to be transmitted to the receiving terminal(s) does not exist in the transmitting terminal, an operation of releasing a PSSCH #2 reserved by the SCI #1 (e.g., deactivation operation) may be performed.

For example, the transmitting terminal may generate the SCI #2 including an information element indicating release of the PSSCH #2, and may transmit the SCI #2 to the receiving terminal(s) on the PSCCH #2 (S1104). The SCI #2 may be transmitted based on a broadcast scheme. In this case, all receiving terminals may receive the SCI #2, and may identify that the PSSCH #2 is released based on the information element included in the SCI #2. In order to support this operation, a cyclic redundancy check (CRC) of the SCI #2 may be scrambled by a cell specific identifier (ID) or a value derived from time and/or frequency resources in which the SCI #2 is transmitted. An SCI format including an information element(s) indicating release of the reserved resource (e.g., PSSCH) may be preconfigured, and the preconfigured SCI format may be transmitted in the step S1104. When the preconfigured SCI format is received, all receiving terminals may identify that the reserved resource is released.

The receiving terminal(s) may receive the SCI #2 by performing a monitoring operation on the PSCCH occasion #2, and may identify information element(s) included in the SCI #2. The monitoring operation may be performed using the cell specific ID or the value derived from time and/or frequency resources in which the SCI #2 is transmitted. The receiving terminal(s) may identify that the PSSCH #2 (e.g., PSSCH #2 reserved by the SCI #1) is released based on the information element included in the SCI #2, and release the reserved PSSCH #2. That is, the PSSCH #2 reserved between the transmitting terminal and the receiving terminal(s) may be released. Therefore, sidelink communication between the transmitting terminal and the receiving terminal(s) may not be performed on the PSSCH #2.

On the other hand, when the multi-SCI scheme is used, two SCIs (e.g., 1st-stage SCI and 2nd-stage SCI) may be used to schedule data transmission. A transmission/reception operation of data may be performed based on the information element(s) included in the 1st-stage SCI and/or the 2nd-stage SCI. In addition, the 1st-stage SCI and/or the 2nd-stage SCI may further include resource allocation information for transmission of the next data (e.g., reservation information of a next PSSCH). Here, the 1st-stage SCI may be transmitted on a PSCCH, and the 2nd-stage SCI may be transmitted on a PSSCH. For example, the 2nd-stage SCI may be multiplexed with data on the PSSCH. The 2nd-stage SCI may be included in a higher layer header and/or a MAC CE transmitted on the PSSCH.

Resources in which the 2nd-stage SCI is transmitted may be indicated by an explicit scheme, an implicit scheme, or a combination of an explicit scheme and an implicit scheme. For example, the 1st-stage SCI may include information indicating resources in which the 2nd-stage SCI is transmitted. When the 2nd-stage SCI is transmitted on the PSSCH, the 1st-stage SCI may include MCS information for the 2nd-stage SCI. For example, the information element(s) required for decoding of the 2nd-stage SCI may be included in the 1st-stage SCI. MCS information for data may be included in the 1st-stage SCI and/or the 2nd-stage SCI. Information indicating resources in which the 1st-stage SCI and/or the 2nd-stage SCI are transmitted may be included in a previous SCI or a short-term reservation message.

Figure 12A:
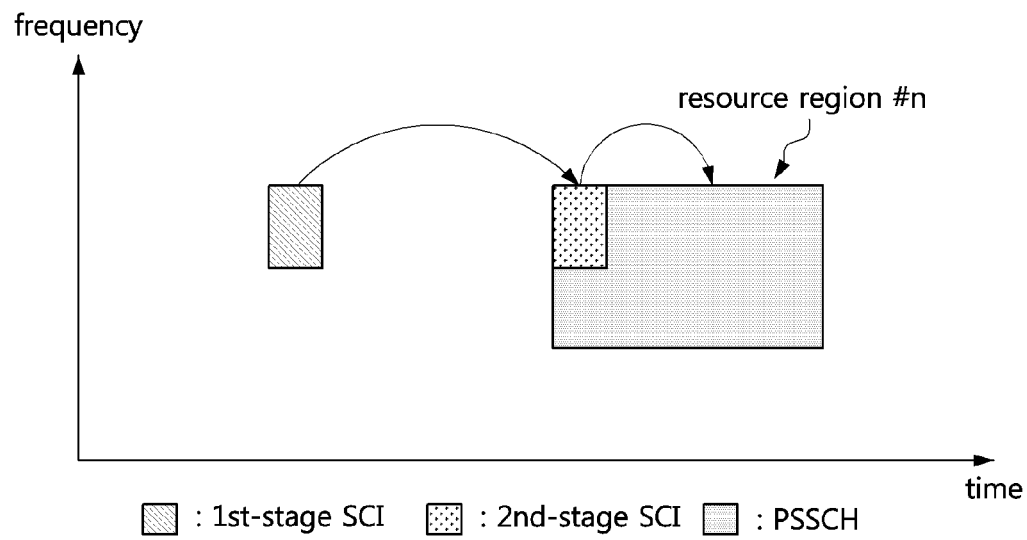
FIG. 12A is a conceptual diagram illustrating a first exemplary embodiment of a method for reserving sidelink resources when the multi-SCI scheme is used in a communication system.
Figure 12B:
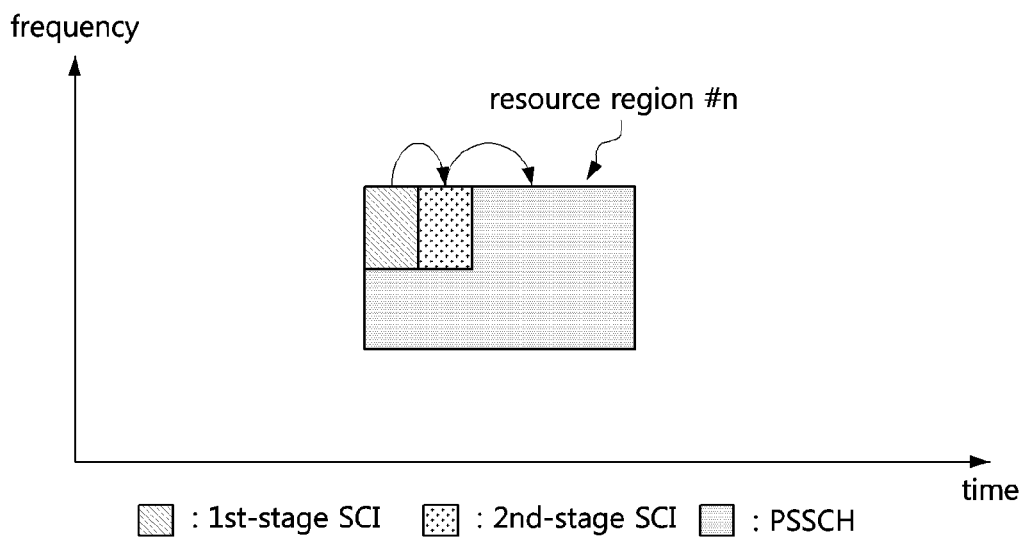
FIG. 12B is a conceptual diagram illustrating a second exemplary embodiment of a method for reserving sidelink resources when the multi-SCI scheme is used in a communication system.

FIG. 12A is a conceptual diagram illustrating a first exemplary embodiment of a method for reserving sidelink resources when the multi-SCI scheme is used in a communication system, and FIG. 12B is a conceptual diagram illustrating a second exemplary embodiment of a method for reserving sidelink resources when the multi-SCI scheme is used in a communication system.

As shown in FIG. 12A, the 1st-stage SCI may be transmitted before a resource region #n, and the 2nd-stage SCI and data may be transmitted in the resource region #n. For example, the 1st-stage SCI may be transmitted in a resource region #n−1 located before the resource region #n. n may be a natural number. As shown in FIG. 12B, the 1st-stage SCI, the 2nd-stage SCI, and the data may be transmitted in the same resource region #n.

In the exemplary embodiments shown in FIGS. 12A and 12B, the 1st-stage SCI may be transmitted on a PSCCH, and the 2nd-stage SCI may be transmitted on another PSCCH or a PSSCH. Each of resource allocation information of the 1st-stage SCI, resource allocation information of the 2nd-stage SCI, and resource allocation information of the data (e.g., PSSCH) may include time resource allocation information and/or frequency resource allocation information. The time resource allocation information may be one or a combination of two or more of the number of symbols, symbol index(es), the number of slots, slot index(es), the number of subframes, subframe index(es), a time offset, and a duration. The frequency resource allocation information may be one or a combination of two or more of the number of REs, RE index(es), the number of subcarriers, subcarrier index(es), the number of PRBs, PRB index(es), the number of subchannels, subchannel index(es), the number of RB sets, and RB set index(es). The resource region #n may be indicated by the above-described time resource allocation information and/or frequency resource allocation information.

The receiving terminal(s) may obtain the 1st-stage SCI by performing a blind decoding operation, and may identify the resources in which the 2nd-stage SCI is transmitted based on the information element(s) included in the 1st-stage SCI. The receiving terminal(s) may obtain the 2nd-stage SCI from the resources indicated by the 1st-stage SCI. Since the 1st-stage SCI includes the resource allocation information of the 2nd-stage SCI, the receiving terminal(s) may not perform a blind decoding operation to obtain the 2nd-stage SCI.

The resources in which the 2nd-stage SCI is transmitted may be indicated based on the resources in which the 1st-stage SCI is actually transmitted or an SCI occasion in which the 1st-stage SCI can be transmitted (e.g., 1st-stage SCI occasion). In this case, the 1st-stage SCI may include a time offset and/or a frequency offset. The time offset may be an offset between a reference time resource (e.g., the time resource of the 1st-stage SCI) and a time resource of the 2nd-stage SCI. The frequency offset may be an offset between a reference frequency resource (e.g., the frequency resource of the 1st-stage SCI) and a frequency resource of the 2nd-stage SCI.

The resources in which the 2nd-stage SCI is actually transmitted within the 2nd-stage SCI occasion may be determined based on the positions of the transmission resources of the 1st-stage SCI. The SCI occasions (e.g., 1st-stage SCI occasion and/or 2nd-stage SCI occasion) may be configured through cell-specific signaling, resource pool-specific signaling, UE-specific signaling, or sidelink (SL)-specific signaling. In the exemplary embodiment shown in FIG. 12A, when the 1st-stage SCI is transmitted in a specific resource region located before the resource region #n, the specific resource region may be configured as the 1st-stage SCI occasion. The specific resource region may mean a PSCCH occasion.

The 1st-stage SCI may include resource allocation information of the 2nd-sage SCI. The resource allocation information included in the 1st-stage SCI may be one or a combination of two or more the number of symbols, symbol index(es), the number of slots, slot index(es), the number of subframes, subframe index(es), a time offset, a duration, the number of REs, RE index(es), the number of subcarriers, subcarrier index(es), the number of PRBs, PRB index(es), the number of subchannels, subchannel index(es), the number of RB sets, and RB sets index(es).

Figure 13:
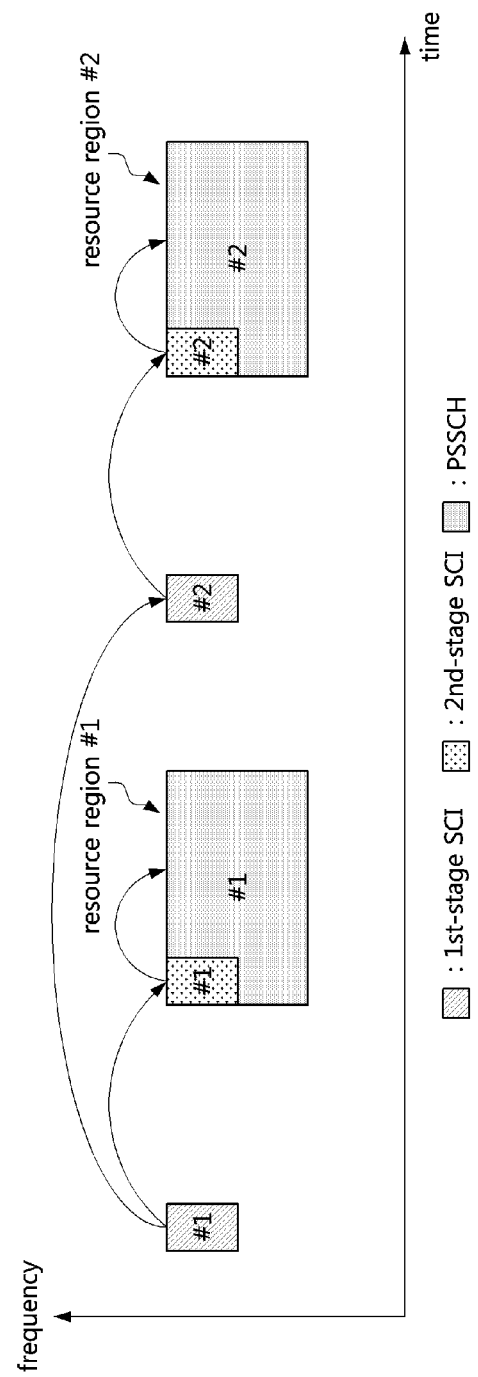
FIG. 13 is a conceptual diagram illustrating a third exemplary embodiment of a method for reserving sidelink resources when the multi-SCI scheme is used in a communication system.

FIG. 13 is a conceptual diagram illustrating a third exemplary embodiment of a method for reserving sidelink resources when the multi-SCI scheme is used in a communication system.

As shown in FIG. 13, the 1st-stage SCI #1 may be used to reserve resources in which the 2nd-stage SCI #1 is transmitted and resources through which the 1st-stage SCI #2 is transmitted. For example, the 1st-stage SCI #1 may include resource allocation information of the 2nd-stage SCI #1 and resource allocation information of the 1st-stage SCI #2. Each of the resource allocation information of the 2nd-stage SCI #1 and the resource allocation information of the 1st-stage SCI #2 may be one or a combination of one or more of the number of symbols, symbol index(es), the number of slots, slot index(es), the number of subframes, subframe index(es), a time offset, a duration, the number of REs, RE index(es), the number of subcarriers, subcarrier index(es), the number of PRBs, PRB index(es), the number of subchannels, subchannel index(es), the number of RB sets, and RB set index(es).

Each of the resource allocation information of the 2nd-stage SCI #1 and the resource allocation information of the 1st-stage SCI #2 may be indicated by an explicit scheme, an implicit scheme, or a combination of an explicit scheme and an implicit scheme. The implicit scheme may be a scheme of indicating the resource allocation information based on information that the transmitting terminal and the receiving terminal(s) know together with each other.

The resource allocation information of the 2nd-stage SCI #1 may indicate a 2nd-stage SCI occasion in which the 2nd-stage SCI #1 can be transmitted or resources in which the 2nd-stage SCI #1 is actually transmitted within the 2nd-stage SCI occasion. The resource allocation information of the 1st-stage SCI #2 may indicated a 1st-stage SCI occasion in which the 1st-stage SCI #2 can be transmitted or resources in which the 1st-stage SCI #2 is actually transmitted within the 1st-stage SCI occasion.

For example, the 1st-stage SCI #1 may include information indicating the resources in which the 2nd-stage SCI #1 is actually transmitted within the 2nd-stage SCI occasion and information indicating the 1st-stage SCI occasion in which the 1st-stage SCI #2 can be transmitted. Alternatively, the 1st-stage SCI #1 may indicate information indicating resources in which the 2nd-state SCI #1 is actually transmitted within the 2nd-stage SCI occasion and information indicating resources in which the 1st-stage SCI #2 is actually transmitted within the 1st-stage SCI occasion. Alternatively, the 1st-stage SCI #1 may include information indicating the PSSCH #1 on which the 2nd-stage SCI #1 is located and information indicating the PSSCH #2 on which the 2nd-stage SCI #2 is located.

The 1st-stage SCI #1 may include resource allocation information of the 2nd-stage SCI #1 for transmission of the PSSCH #1 (e.g., data #1) and resource allocation information of the 1st-stage SCI #2 for reservation of transmission resources of the PSSCH #2 (e.g., data #2). The 1st-stage SCI #1 may include information indicating the 2nd-stage SCI occasion in which the 2nd-stage SCI #1 can be transmitted and information indicating the 1st-stage SCI occasion in which the 1st-stage SCI #2 can be transmitted. The 2nd-stage SCI occasion in which the 2nd-stage SCI #1 can be transmitted may be relatively indicated based on the position of the resources in which the 1st-stage SCI #1 is transmitted. The 1st-stage SCI occasion in which the 1st-stage SCI #2 can be transmitted may be relatively indicated based on the position of the 2nd-stage SCI occasion in which the 2nd-stage SCI #1 can be transmitted.

The resources in which the 2nd-stage SCI #1 is transmitted within the 2nd-stage SCI occasion may be calculated based on the position of the PSCCH #1 to which the 1st-stage SCI #1 belongs. The resources in which the 1st-stage SCI #2 is transmitted within the 1st-stage SCI occasion may be calculated based on the position of the PSCCH #1 to which the 1st-stage SCI #1 belongs. The above-described method of indicating the resource allocation information of the 2nd-stage SCI may be used to indicate a PSSCH (e.g., a PSSCH in which the 2nd-stage SCI is multiplexed).

Figure 14:
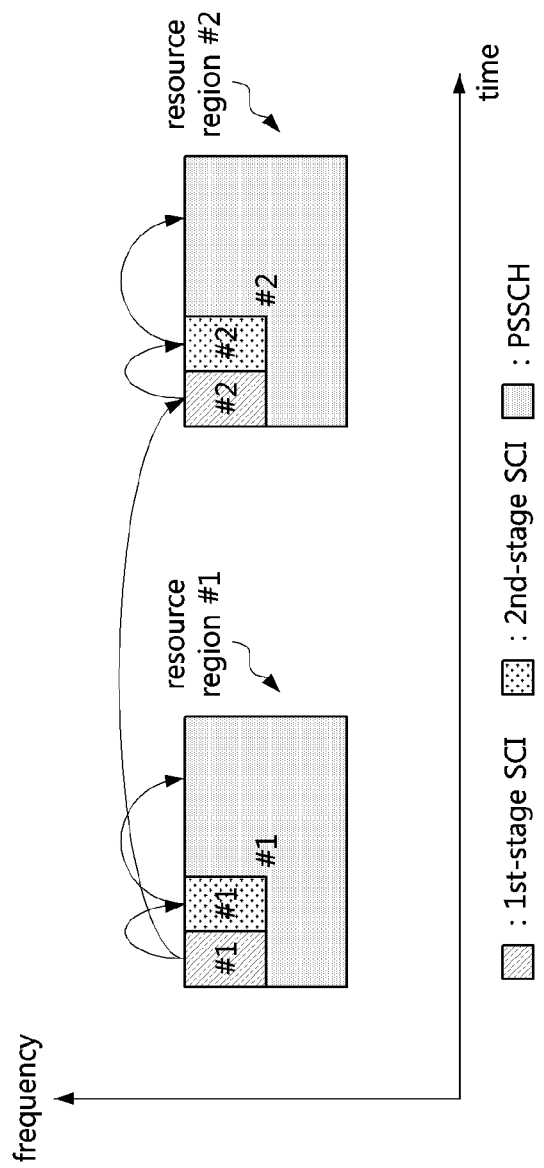
FIG. 14 is a conceptual diagram illustrating a fourth exemplary embodiment of a method for reserving sidelink resources when the multi-SCI scheme is used in a communication system.

FIG. 14 is a conceptual diagram illustrating a fourth exemplary embodiment of a method for reserving sidelink resources when the multi-SCI scheme is used in a communication system. As shown in FIG. 14, the 1st-stage SCI and the 2nd-stage SCI may be transmitted in the same resource region. Resources in which the 1st-stage SCI is transmitted and resources in which the 2nd-stage SCI is transmitted may be allocated consecutively in the same resource region. The method of indicating resource allocation information in the exemplary embodiment shown in FIG. 13 may be applied to the exemplary embodiment shown in FIG. 14. The 1st-stage SCI #1 may directly or indirectly indicate resource allocation information of the 1st-stage SCI #2, resource allocation information of the 2nd-stage SCI #2, and resource allocation information of the PSSCH #2.

The receiving terminal(s) may receive the 1st-stage SCI #1 by performing blind decoding on the 1st-stage SCI occasion. The 1st-stage SCI #1 may indicate all or some resources of each of the resources of the 1st-stage SCI #2, the resources of the 2nd-stage SCI #2, and the resources of the PSSCH #2. The 2nd-stage SCI #2 may be transmitted in resources associated with the resources in which the 1st-stage SCI #1 is transmitted within the resource region.

"Resources are associated with each other" may mean "a transmission start time of the 1st-stage SCI #1 is used equally in the associated resources" or "the associated resources are changeable according to a specific calculation scheme." The number of REs in which the 1st-stage SCI #1 is transmitted may be indicated by a scheme applied to the 1st-stage SCI #2. The number of REs in which the 1st-stage SCI #1 is transmitted may be explicitly or implicitly indicated by information element(s) obtained after reception of the 1st-stage SCI #1.

Figure 15:
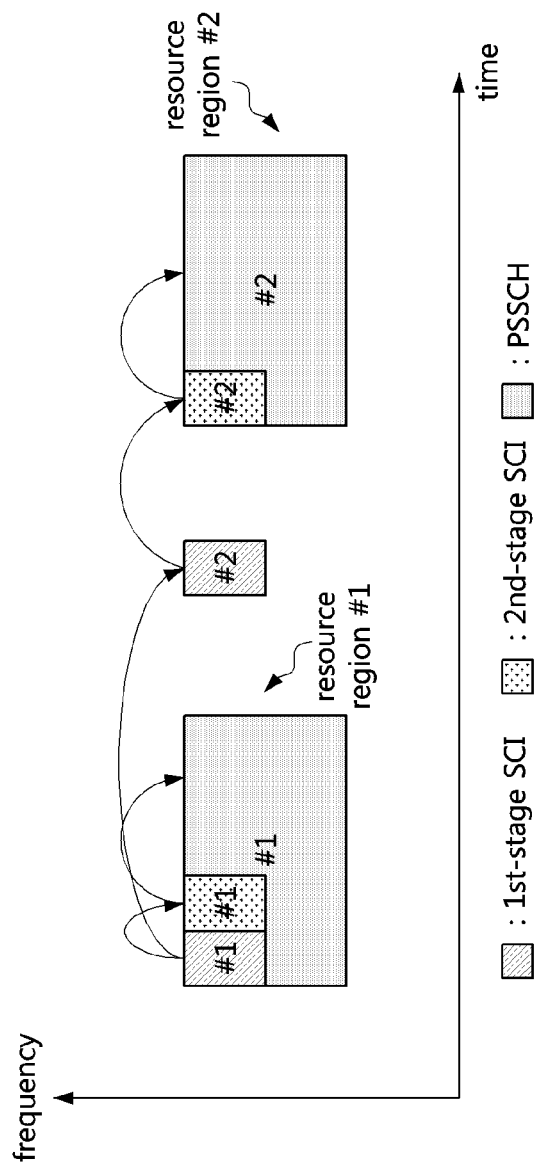
FIG. 15 is a conceptual diagram illustrating a fifth exemplary embodiment of a method for reserving sidelink resources when the multi-SCI scheme is used in a communication system.

FIG. 15 is a conceptual diagram illustrating a fifth exemplary embodiment of a method for reserving sidelink resources when the multi-SCI scheme is used in a communication system. As shown in FIG. 15, the 1st-stage SCI #1, the 2nd-stage SCI #1, and the PSSCH #1 may be located in the same resource region #1. The 1st-stage SCI #2 may be transmitted before the resource region #2 in which the 2nd-stage SCI #2 and the PSSCH #2 are located. In this case, the 1st-stage SCI #2 may be located in a resource region different from the resource region #2. Resource allocation information of the 1st-stage SCI #1, resource allocation information of the 2nd-stage SCI #1, resource allocation information of the PSSCH #1, resource allocation information of the 1st-stage SCI #2, resource allocation of the 2nd-stage SCI #2, and resource allocation information of a PSSCH #2 may be indicated by the above-described scheme.

Figure 16:
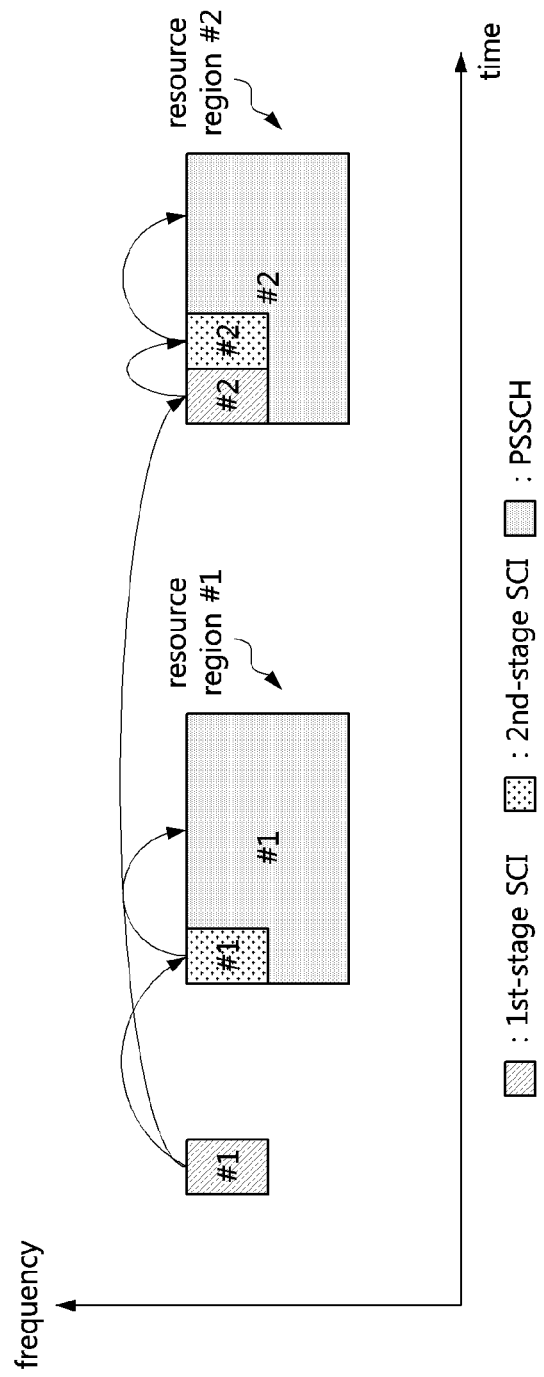
FIG. 16 is a conceptual diagram illustrating a sixth exemplary embodiment of a method for reserving sidelink resources when the multi-SCI scheme is used in a communication system.

FIG. 16 is a conceptual diagram illustrating a sixth exemplary embodiment of a method for reserving sidelink resources when the multi-SCI scheme is used in a communication system. As shown in FIG. 16, the 1st-stage SCI #1 may be transmitted before the resource region #1 in which the 2nd-stage SCI #1 and the PSSCH #1 are located. In this case, the 1st-stage SCI #1 may be located in a resource region different from the resource region #1. The 1st-stage SCI #2, the 2nd-stage SCI #2, and the PSSCH #2 may be located in the same resource region #2. Resource allocation information of the 1st-stage SCI #1, resource allocation information of the 2nd-stage SCI #1, resource allocation information of the PSSCH #1, resource allocation information of the 1st-stage SCI #2, resource allocation of the 2nd-stage SCI #2, and resource allocation information of the PSSCH #2 may be indicated by the above-described scheme.

Figure 17:
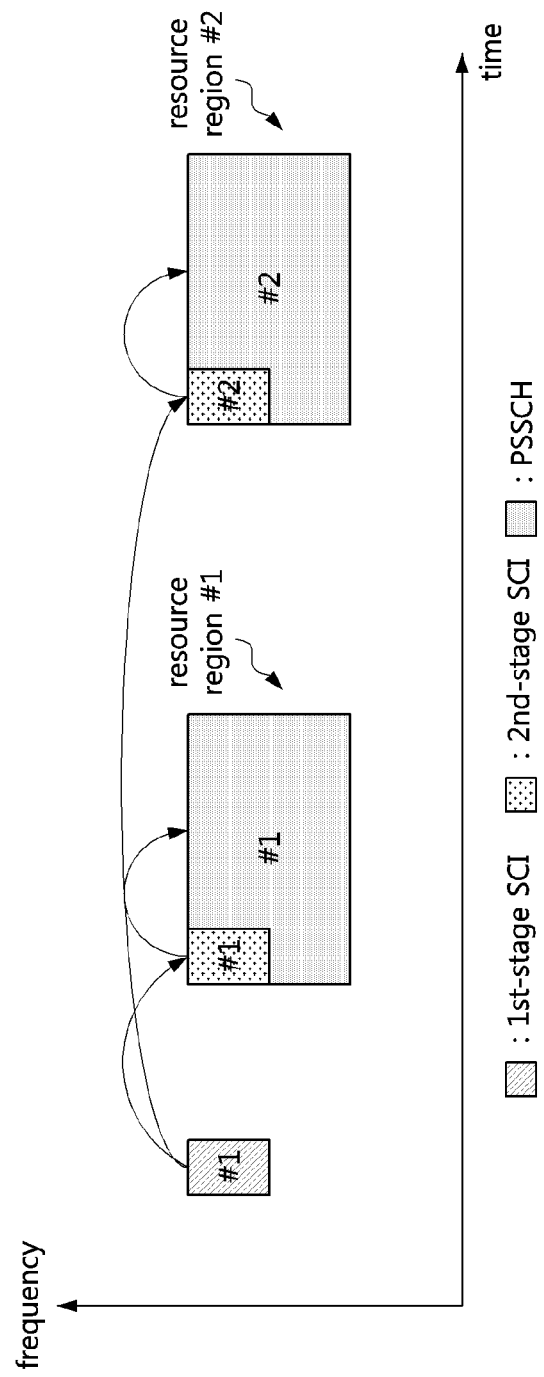
FIG. 17 is a conceptual diagram illustrating a seventh exemplary embodiment of a method for reserving sidelink resources when the multi-SCI scheme is used in a communication system.

FIG. 17 is a conceptual diagram illustrating a seventh exemplary embodiment of a method for reserving sidelink resources when the multi-SCI scheme is used in a communication system. As shown in FIG. 17, the 1st-stage SCI #1 may include resource allocation information of the 2nd-stage SCI #1 and resource allocation information of the 2nd-stage SCI #2. That is, the 1st-stage SCI #1 may be used to reserve transmission resources of the 2nd-stage SCI #1 and transmission resources of the 2nd-stage SCI #2. Each of the resource allocation information of the 2nd-stage SCI #1 and the resource allocation information of the 2nd-stage SCI #2 may be one or a combination of one or more of the number of symbols, symbol index(es), the number of slots, slot index(es), the number of subframes, subframe index(es), a time offset, a duration, the number of REs, RE index(es), the number of subcarriers, subcarrier index(es), the number of PRBs, PRB index(es), the number of subchannels, subchannel index(es), the number of RB sets, and RB set index(es).

Each of the resource allocation information of the 2nd-stage SCI #1 and the resource allocation information of the 2nd-stage SCI #2 may be indicated by an explicit scheme, an implicit scheme, or a combination of an explicit scheme and an implicit scheme. The implicit scheme may be a scheme of indicating the resource allocation information based on information that the transmitting terminal and the receiving terminal(s) know with each other.

The resource allocation information of the 2nd-stage SCI #1 may indicate the 2nd-stage SCI occasion in which the 2nd-stage SCI #1 can be transmitted or resources in which the 2nd-stage SCI #1 is transmitted within the 2nd-stage SCI occasion. The resource allocation information of the 2nd-stage SCI #2 may indicate the 2nd-stage SCI occasion in which the 2nd-stage SCI #2 can be transmitted or resources in which the 2nd-stage SCI #2 is transmitted within the 2nd-stage SCI occasion.

Alternatively, the 1st-stage SCI #1 may include resource allocation information of the PSSCH associated with the 2nd-stage SCI. The 1st-stage SCI #1 may indicate resources in which the 2nd-stage SCI #1 is transmitted and the 2nd-stage SCI occasion in which the 2nd-stage SCI #2 can be transmitted. Alternatively, the 1st-stage SCI #1 may indicate resources in which the 2nd-stage SCI #1 is transmitted and resources in which the 2nd-stage SCI #2 is transmitted. Alternatively, the 1st-stage SCI #1 may indicate the 2nd-stage SCI occasion in which the 2nd-stage SCI #1 can be transmitted and the 2nd-stage SCI occasion in which the 2nd-stage SCI #2 can be transmitted. Alternatively, the 1st-stage SCI #1 may indicate the 2nd-stage SCI occasion in which the 2nd-stage SCI #1 can be transmitted and resources in which the 2nd-stage SCI #2 is transmitted.

The 2nd-stage SCI occasion in which the 2nd-stage SCI #1 or the 2nd-stage SCI #2 can be transmitted may be indicated relatively based on the resources in which the 1st-stage SCI #1 is transmitted or the 1st-stage SCI occasion. The position of the resources in which the 2nd-stage SCI #1 or the 2nd-stage SCI #2 is transmitted within the 2nd-stage SCI occasion may be determined based on the position of the PSCCH to which the 1st-stage SCI #1 belongs.

Sidelink resources may be allocated (e.g., reserved) by one or a combination of two or more of the schemes described based on FIGS. 13 to 17. For example, in an initial transmission procedure of new data, sidelink resources may be allocated (e.g., reserved) by the scheme shown in FIG. 13. In a data retransmission procedure, sidelink resources may be allocated (e.g., reserved) by the scheme shown in FIG. 17. In this case, the receiving terminal may identify whether SCI(s) indicated by the 1st-stage SCI #1 are "the 2nd-stage SCI #1 and the 1st-stage SCI #2" or "the 2nd-stage SCI #1 and the 2nd-stage SCI #2."

In order to support this operation, an information element (e.g., specific indicator, NDI) indicating the type of the SCI(s) indicated by the 1st-stage SCI #1 may be included in the 1st-stage SCI #1, the 2nd-stage SCI #1, the 1st-stage SCI #2, and/or the 2nd-stage SCI #2. When the information element indicates a type 1, the 1st-stage SCI #1 may indicate the 2nd-stage SCI #1 and the 1st-stage SCI #2. When the information element indicates a type 2, the 1st-stage SCI #1 may indicate the 2nd-stage SCI #1 and the 2nd-stage SCI #2. Alternatively, the type of SCI(s) indicated by the 1st-stage SCI #1 may be indicated by a scrambling sequence or a CRC masking scheme.

The format of the 1st-stage SCI may be configured differently from the format of the 2nd-stage SCI. In this case, the receiving terminal may determine whether the corresponding SCI is the 1st-stage SCI or the 2nd-stage SCI based on the format of the received SCI. Alternatively, the SCI (e.g., the 1st-stage SCI or the 2nd-stage SCI) may include an information element indicating the format of the corresponding SCI. Alternatively, the SCI format may be implicitly indicated.

The resources indicated by the 1st-stage SCI #1 may indicate resources in which the 2nd-stage SCI #1 is transmitted or the PSSCH #1 to which the 2nd-stage SCI #1 belongs. In addition, the resources indicated by the 1st-stage SCI #1 may indicate resources in which the 1st-stage SCI #2 is transmitted or the PSCCH #2 to which the 1st-stage SCI #2 belongs. The 1st-stage SCI #1 may indicate resources in which data is transmitted. The resources in which data is transmitted may be indicated based on the above-described scheme.

In the exemplary embodiments shown in FIGS. 13 to 17, the reserved resources may be released according to the scheme shown in FIG. 11. For example, in the exemplary embodiment shown in FIGS. 13 to 17, when there is no data to be transmitted on the PSSCH #1 reserved by the 1st-stage SCI #1, the 2nd-stage SCI #1 may include an information element indicating release of the reserved PSSCH #1. In addition, in the exemplary embodiment shown in FIG. 17, when there is no data to be transmitted on the PSSCH #2 reserved by the 1st-stage SCI #1, the 2nd-stage SCI #1 and/or the 2nd-stage SCI #2 may include an information element indicating release of the reserved PSSCH #2.

Transmission resources of the 2nd-stage SCI or PSSCHs associated with the 2nd-stage SCI may be reserved as many as the number of data retransmissions. The transmission resources of the 2nd-stage SCI or the PSSCHs associated with the 2nd-stage SCI may be reserved by the 1st-stage SCI. When retransmission of data is not required (e.g., when ACK is received from all receiving terminals or when NACK does not occur), the 2nd-stage SCI may include an information element indicating release of the transmission resources reserved by the 1st-stage SCI or the PSSCHs reserved by the 1st-stage SCI.

The 1st-stage SCI may include information element(s) related to a semi-persistent scheduling (SPS) operation or a blind retransmission operation and resource allocation information of the first 2nd-stage SCI. In addition, the 1st-stage SCI may include resource allocation information for transmission of a periodic SCI (e.g., periodic 2nd-stage SCI) and resource allocation information of a PSSCH associated with the periodic SCI. Accordingly, after transmission of the 1st-stage SCI, the 2nd-stage SCI (e.g., PSSCH including the 2nd-stage SCI) may be periodically transmitted. The transmission operation according to the SPS operation or the blind retransmission operation may be repeatedly performed as many times as the maximum number of transmissions. The 2nd-stage SCI may include an information element indicating release of resources configured by the SPS operation or resources configured for the blind retransmission operation. Accordingly, the resources configured by the SPS operation or the resources configured for the blind retransmission operation may be released.

Figure 18:
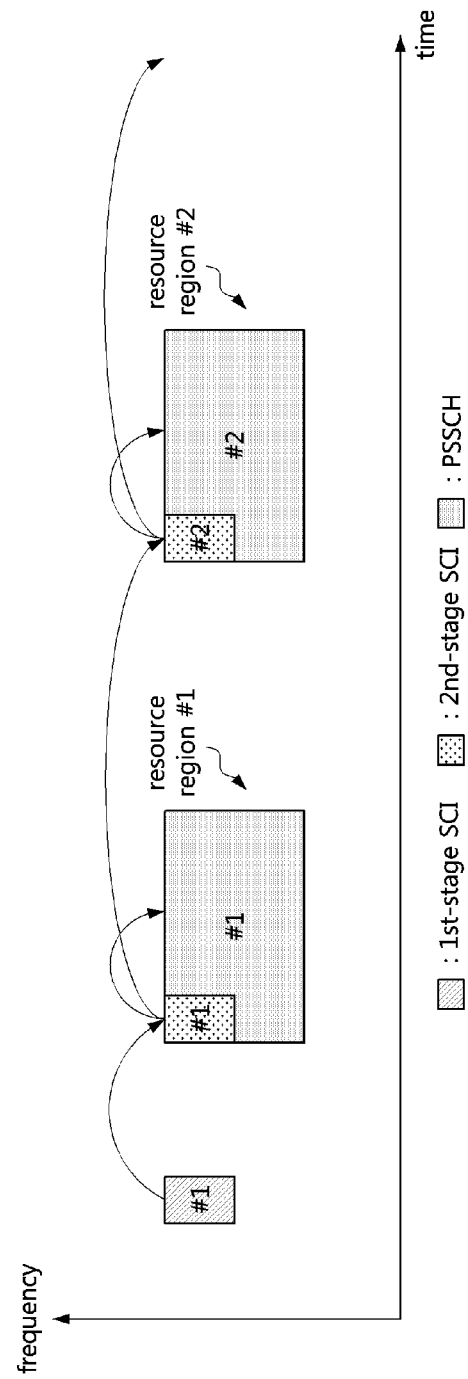
FIG. 18 is a conceptual diagram illustrating an eighth exemplary embodiment of a method for reserving sidelink resources when the multi-SCI scheme is used in a communication system.

FIG. 18 is a conceptual diagram illustrating an eighth exemplary embodiment of a method for reserving sidelink resources when the multi-SCI scheme is used in a communication system. As shown in FIG. 18, the 2nd-stage SCI #1 may indicate resources in which the 2nd-stage SCI #2 is to be transmitted or the PSSCH #2 associated with the 2nd-stage SCI #2. Frequency resources in which the 2nd-stage SCI #1 is transmitted (e.g., frequency resources of the PSSCH #1 associated with the 2nd-stage SCI #1) may be the same as frequency resources in which the 2nd-stage SCI #2 is transmitted (e.g., frequency resources of the PSSCH #2 associated with the 2nd-stage SCI #2). In this case, frequency resource allocation information of the 2nd-stage SCI #2 may not be included in the 2nd-stage SCI #1. The 2nd-stage SCI #1 may include time resource allocation information of the 2nd-stage SCI #2. The time resource allocation information may be a time offset (e.g., x symbols, x slots, or x subframes) between the time resources of the 2nd-stage SCI #1 and the time resources of the 2nd-stage SCI #2.

The time offset (e.g., x) between the time resources of the 2nd-stage SCI #1 and the time resources of the 2nd-stage SCI #2 may be indicated by one or a combination of two or more of higher layer signaling, MAC signaling, and PHY signaling. The time offset (e.g., x) may be set by cell-specific signaling, resource pool-specific signaling, UE-specific signaling, or SL-specific signaling. In this case, the 2nd-stage SCI #1 may include an information element indicating whether to perform resource allocation (e.g., resource reservation) for the 2nd-stage SCI #2. Here, the information element may indicate that the time offset (e.g., x) set by higher layer signaling and/or MAC signaling is applied or enabled. "The time offset is applied (or enabled)" may mean "a resource for the 2nd-stage SCI #2 is allocated." "The time offset is not applied (or enabled)" may mean "a resource for the 2nd-stage SCI #2 is not allocated."

The receiving terminal(s) may identify whether the resource for the 2nd-stage SCI #2 is allocated based on the information element included in the 2nd-stage SCI #1. When the resource for the 2nd-stage SCI #2 is allocated, the receiving terminal(s) may determine that the 2nd-stage SCI #2 is transmitted after the time offset corresponding to x set by higher layer signaling and/or MAC signaling, and may perform a reception operation for the 2nd-stage SCI #2. In addition, the receiving terminal(s) may determine that the 2nd-stage SCIs are received in the same frequency region.

The frequency region in which the 2nd-stage SCIs are transmitted may be calculated based on specific information (e.g., resource pool configuration information) preconfigured between the transmitting terminal and the receiving terminal(s). The frequency region in which the 2nd-stage SCIs are transmitted may be changed according to a calculation result based on the specific information.

Figure 19:
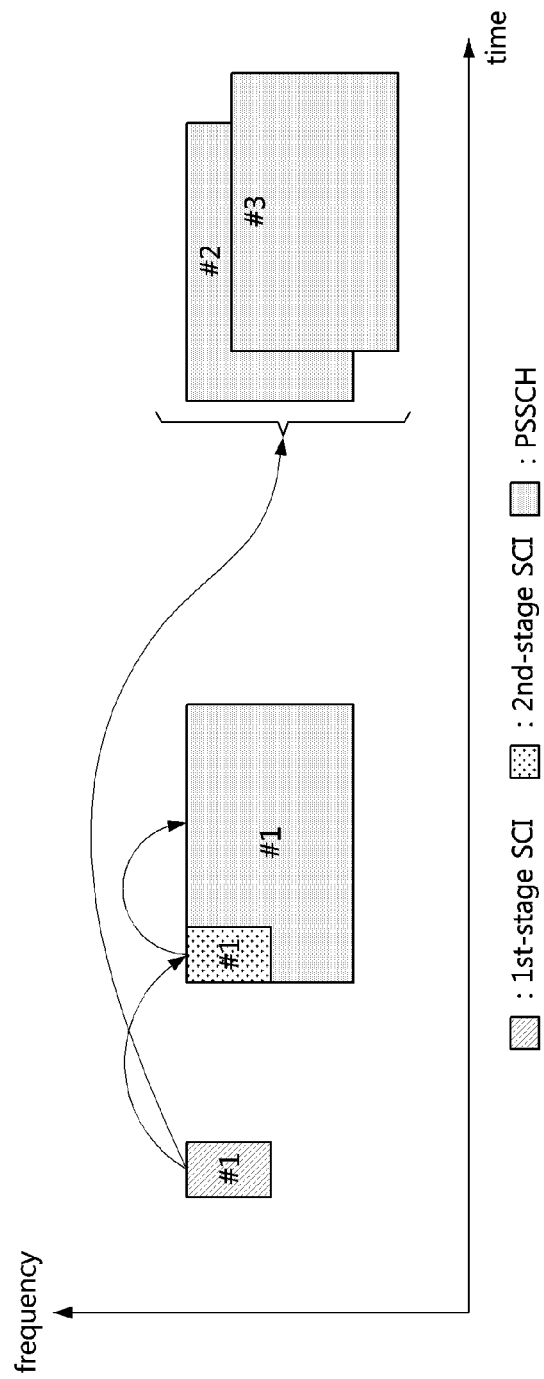
FIG. 19 is a conceptual diagram illustrating a ninth exemplary embodiment of a method for reserving sidelink resources when the multi-SCI scheme is used in a communication system.

FIG. 19 is a conceptual diagram illustrating a ninth exemplary embodiment of a method for reserving sidelink resources when the multi-SCI scheme is used in a communication system. As shown in FIG. 19, the 1st-stage SCI #1 may include resource allocation information of the 2nd-stage SCI #1 and resource allocation information of one or more PSSCHs (e.g., PSSCHs #2 and #3). The resource allocation information of the 2nd-stage SCI #1 may indicate the 2nd-stage PSSCH occasion, resources in which the 2nd-stage SCI #1 is transmitted within the 2nd-stage PSSCH occasion, or the PSSCH #1 associated with the 2nd-stage SCI #1.

When time and frequency resources of each of the one or more PSSCHs (e.g., PSSCHs #2 and #3) are directly indicated, information elements included in the 1st-stage SCI #1 may increase. In order to solve this problem, the one or more PSSCHs (e.g., PSSCH #2 and #3) may be indicated based on the scheme described with reference to FIG. 17. When the size of the frequency resources of each of the one or more PSSCHs (e.g., PSSCH #2 and #3) is identical to the size of the frequency resources of the 2nd-stage SCI #1 or the size of the frequency resources of the PSSCH #1 associated with the 2nd-stage SCI #1, resource allocation information of the one or more PSSCHs (e.g., PSSCHs #2 and #3) may include only time resource allocation information.

The time resource allocation information may be a time offset between the time resources of the 2nd-stage SCI #1 and the time resources of each of the one or more PSSCHs (e.g., PSSCH #2 and #3) or a time offset between the time resources of the PSSCH #1 associated with the 2nd-stage SCI #1 and the time resources of each of the one or more PSSCHs (e.g., PSSCH #2 and #3). The time offset may be set in units of symbols, slots, or subframes. In this case, the 2nd-stage SCI #1 may be transmitted without indication information for additional resource reservation.

The resource allocation information of the one or more PSSCHs (e.g., PSSCH #2 and #3) included in the 1st-stage SCI #1 may be a time offset (e.g., x symbols, x slots, or x subframes) based on the PSSCH #1 (e.g., 2nd-stage SCI #1) in the time domain. x may be a natural number. x may be indicated by one or a combination of two or more of higher layer signaling, MAC signaling, and PHY signaling. x may be indicated by cell-specific signaling, resource pool-specific signaling, UE-specific signaling, or SL-specific signaling. When x is indicated by higher layer signaling and/or MAC signaling, the resource allocation information of the one or more PSSCHs (e.g., PSSCH #2 and #3) included in the 1st-stage SCI #1 may include an information element (e.g., indicator having a size of 1 bit) indicating whether to allocate the one or more PSSCHs (e.g., PSSCH #2 and #3).

Here, the information element may indicate that the time offset (e.g., x) set by higher layer signaling and/or MAC signaling is applied or enabled. "The time offset is applied (or enabled)" may mean "resources for the one or more PSSCHs are allocated." "The time offset is not applied (or enabled)" may mean "resources for the one or more PSSCHs are not allocated."

When the information element included in the 1st-stage SCI #1 indicates that one or more PSSCHs (e.g., PSSCHs #2 and #3) are allocated, the receiving terminal(s) may perform a reception operation for the one or more PSSCHs (e.g., PSSCHs #2 and #3) after the time offset corresponding to x set by higher layer signaling and/or MAC signaling. Here, the PSSCHs #1 to #3 may be located in the same frequency region, and a time offset between the PSSCH #1 and the PSSCH #2 may be the same as a time offset between the PSSCH #2 and the PSSCH #3. The frequency region of the plurality of PSSCHs may be calculated based on specific information (e.g., resource pool configuration information) preconfigured between the transmitting terminal and the receiving terminal(s). The frequency region of the PSSCHs may be changed according to a calculation result based on the specific information.

The frequency resources of the PSSCH #2 may be different from the frequency resources of the PSSCH #3. A frequency offset between the frequency resources of the PSSCH #2 and the frequency resources of the PSSCH #3 may be y REs, y subcarriers, or y PRBs. The frequency offset (e.g., y) between the PSSCHs may be indicated by one or a combination of two or more of higher layer signaling, MAC signaling, and PHY signaling. y may be indicated by cell-specific signaling, resource pool-specific signaling, UE-specific signaling, or SL-specific signaling. When y is indicated by higher layer signaling and/or MAC signaling, resource allocation information of the one or more PSSCHs (e.g., PSSCHs #2 and #3) included in the 1st-stage SCI #1 may include an information element (e.g., indicator having a size of 1 bit) indicating whether to allocate the one or more PSSCHs (e.g., PSSCHs #2 and #3).

Here, the information element may indicate that the frequency offset (e.g., y) set by higher layer signaling and/or MAC signaling is applied or enabled. "The frequency offset is applied (or enabled)" may mean "resources for one or more PSSCHs are allocated." "The frequency offset is not applied (or enabled)" may mean "resources for one or more PSSCHs are not allocated."

When the information element included in the 1st-stage SCI #1 indicates that one or more PSSCHs (e.g., PSSCHs #2 and #3) are allocated, the receiving terminal(s) may perform a reception operation for the one or more PSSCHs (e.g., PSSCHs #2 and #3) configured according to the frequency offset corresponding to y set by higher layer signaling and/or MAC signaling. Here, when not only the frequency offset but also the time offset (e.g., x) are set, the receiving terminal (s) may perform a reception operation for the one or more PSSCHs (e.g., PSSCHs #2 and #3) configured according to the time offset and the frequency offset.

A reference frequency point (or reference frequency resource) used for allocation of each PSSCH may be configured in association with one or more of resource information (e.g., resource pool configuration information), resource information of the 1st-stage SCI #1, resource information of the 2nd-stage SCI #1, and resource information of the PSSCH #1 preconfigured between the transmitting terminal and the receiving terminal(s). The same frequency resource may be configured as a start point or an end point of the PSSCH resource allocation. Alternatively, the position of the frequency region (e.g., frequency resources) may be calculated based on the information element(s) described above.

Figure 20:
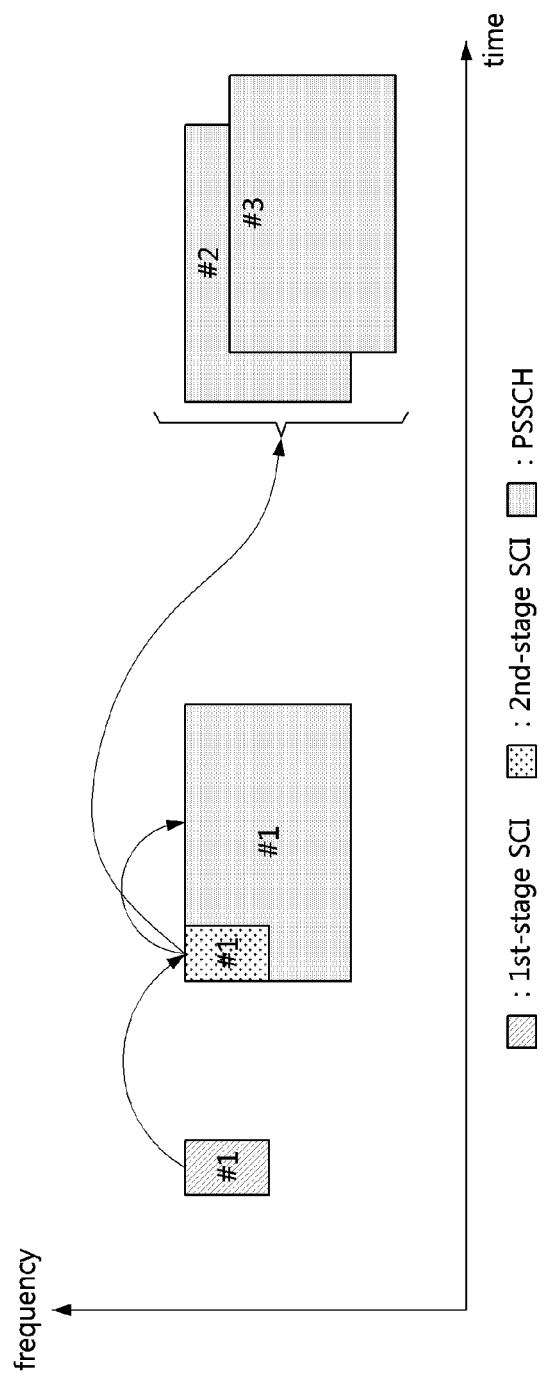
FIG. 20 is a conceptual diagram illustrating a tenth exemplary embodiment of a method for reserving sidelink resources when the multi-SCI scheme is used in a communication system.

FIG. 20 is a conceptual diagram illustrating a tenth exemplary embodiment of a method for reserving sidelink resources when the multi-SCI scheme is used in a communication system. As shown in FIG. 20, resource allocation information of one or more PSSCHs (e.g., PSSCHs #2 and #3) may be included in the 2nd-stage SCI #1 instead of the 1st-stage SCI #1. The one or more PSSCHs (e.g., PSSCHs #2 and #3) may be indicated by the scheme(s) described with reference to FIG. 19.

Figure 21:
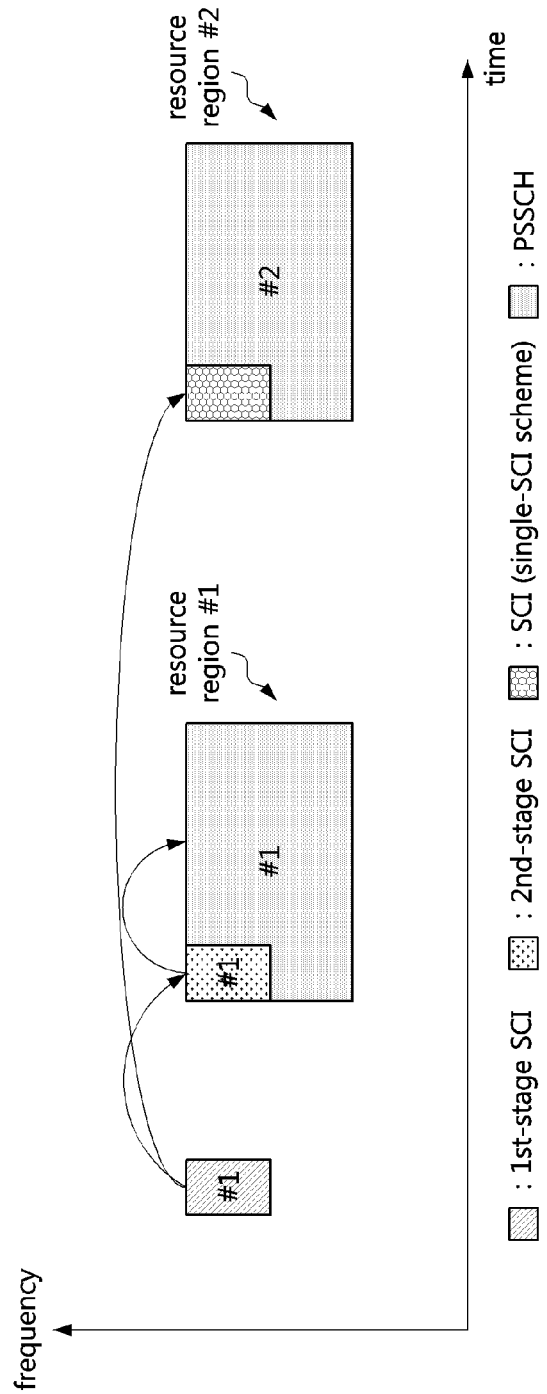
FIG. 21 is a conceptual diagram illustrating an eleventh exemplary embodiment of a method for reserving sidelink resources when the multi-SCI scheme is used in a communication system.

FIG. 21 is a conceptual diagram illustrating an eleventh exemplary embodiment of a method for reserving sidelink resources when the multi-SCI scheme is used in a communication system.

As shown in FIG. 21, after operations based on the multi-SCI scheme, operations based on the single-SCI scheme may be performed. The 1st-stage SCI #1 may include resource allocation information of the 2nd-stage SCI #1 and resource allocation information of the SCI #2 (e.g., single SCI). Sidelink communication may be performed based on the multi-SCI scheme and/or the single-SCI scheme. For example, "operation based on the multi-SCI scheme→operation based on the single-SCI scheme→operation based on the multi-SCI scheme" may be performed. Resources in which the SCI #2 is transmitted or the PSSCH #2 associated with the SCI #2 may be indicated in the same or similar manner as the scheme in which the 1st-stage SCI #1 indicates the transmission resource of the 1st-stage SCI #2 shown in FIG. 13.

Different SCIs received from one or more transmitting terminals may indicate the same time and frequency resources. That is, the same time and frequency resources may be allocated (e.g., reserved) by different SCIs. In this case, the receiving terminal(s) may operate based on information element(s) included in the most recent SCI among the different SCIs. Alternatively, the receiving terminal(s) may operate based on information element(s) included in the SCI received in the SCI occasion associated with a data transmission region among the different SCIs. The receiving terminal(s) may operate based on one or a combination of two or more of the above-described schemes.

The resource region in which the 1st-stage SCI is transmitted may be configured independently of the resource region in which the 2nd-stage SCI is transmitted or the resource region of the PSSCH associated with the 2nd-stage SCI. Alternatively, the resource region in which the 1st-stage SCI is transmitted may be the same as the resource region in which the 2nd-stage SCI is transmitted or the resource region of the PSSCH associated with the 2nd-stage SCI.

In the above-described exemplary embodiments, the base station may transmit a higher layer message including an information element indicating types of resources allocated by the first SCI. The information element may be defined as shown in Table 3 below.

TABLE 3

| Information element | Indication field #1 | Indication field #2 |
|---|---|---|
| 00 | 2nd-stage SCI | 1st-stage SCI |
| 01 | 2nd-stage SCI | PSSCH(s) |

TABLE 3-continued

| Information element | Indication field #1 | Indication field #2 |
|---|---|---|
| 10 | 2nd-stage SCI | Single SCI |
| 11 | 2nd-stage SCI | 2nd-stage SCI |

The 1st-stage SCI may include two indication fields (e.g., indication fields #1 and #2). When the information element (i.e., the information element defined in Table 3) set by higher layer signaling is set to "00," the indication field #1 included in the 1st-stage SCI may include resource allocation information of the 2nd-stage SCI associated with the 1st-stage SCI, and the indication field #2 included in the 1st-stage SCI may include resource allocation information of another 1st-stage SCI. That is, when the information element is set to "00," the resource allocation information included in the 1st-stage SCI may be the same as the resource allocation information included in the 1st-stage SCI #1 shown in FIG. 13.

When the information element (i.e., the information element defined in Table 3) set by higher layer signaling is set to "01," the indication field #1 included in the 1st-stage SCI may include resource allocation information of the 2nd-stage SCI associated with the 1st-stage SCI, and the indication field #2 included in the 1st-stage SCI may include resource allocation information of PSSCH(s). That is, when the information element is set to "01," the resource allocation information included in the 1st-stage SCI may be the same as the resource allocation information included in the 1st-stage SCI #1 shown in FIG. 19.

When the information element (i.e., the information element defined in Table 3) set by higher layer signaling is set to "10," the indication field #1 included in the 1st-stage SCI may include resource allocation information of the 2nd-stage SCI associated with the 1st-stage SCI, and the indication field #2 included in the 1st-stage SCI may include resource allocation information of a single SCI. That is, when the information element is set to "10," the resource allocation information included in the 1st-stage SCI may be the same as the resource allocation information included in the 1st-stage SCI #1 shown in FIG. 21.

When the information element (i.e., the information element defined in Table 3) set by higher layer signaling is set to "11," the indication field #1 included in the 1st-stage SCI may include resource allocation information of the 2nd-stage SCI associated with the 1st-stage SCI, and the indication field #2 included in the 1st-stage SCI may include resource allocation information of another 2nd-stage SCI. That is, when the information element is set to "11," the resource allocation information included in the 1st-stage SCI may be the same as the resource allocation information included in the 1st-stage SCI #1 shown in FIG. 17.

The information element defined in Table 3 may be set semi-statically. For example, the information element defined in Table 3 may be set by higher layer signaling and/or MAC signaling. Alternatively, the information element defined in Table 3 may be set dynamically. For example, the information element defined in Table 3 may be set by PHY signaling (e.g., 1st-stage SCI).

When the information element defined in Table 3 is set by higher layer signaling, the terminals (e.g., transmitting terminal and receiving terminal(s)) may identify the information element defined in Table 3 (e.g., 00, 01, 10, or 11) by receiving a higher layer message. The transmitting terminal may generate the 1st-stage SCI including resource allocation information (e.g., indication fields #1 and #2) corresponding to the information element indicated by the higher layer message, and may transmit the 1st-stage SCI to the receiving terminal(s).

The receiving terminal(s) may receive the 1st-stage SCI from the transmitting terminal. The receiving terminal(s) may interpret the resource allocation information (e.g., indication fields #1 and #2) included in the 1st-stage SCI based on the information element indicated by the higher layer message. For example, when the information element indicated by the higher layer message is set to "00," the receiving terminal(s) may determine that the indication field #1 included in the 1st-stage SCI includes resource allocation information of the 2nd-stage SCI associated with the 1st-stage SCI, and may determine that the indication field #2 included in the 1st-stage SCI includes resource allocation information of another 1st-stage SCI.

When the information element indicated by the higher layer message is set to "01," the receiving terminal(s) may determine that the indication field #1 included in the 1st-stage SCI includes resource allocation information of the 2nd-stage SCI associated with the 1st-stage SCI, and may determine that the indication field #2 included in the 1st-stage SCI includes resource allocation information of PSSCH(s). When the information element indicated by the higher layer message is set to "10," the receiving terminal(s) may determine that the indication field #1 included in the 1st-stage SCI includes resource allocation information of the 2nd-stage SCI associated with the 1st-stage SCI, and may determine that the indication field #2 included in the 1st-stage SCI includes resource allocation information of a single SCI.

When the information element indicated by the higher layer message is set to "11," the receiving terminal(s) may determine that the indication field #1 included in the 1st-stage SCI includes resource allocation information of the 2nd-stage SCI associated with the 1st-stage SCI, and may determine that the indication field #2 included in the 1st-stage SCI includes resource allocation information of another 2nd-stage SCI.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. A method of operating a transmitting terminal in a communication system, the method comprising:
    generating a first-stage sidelink control information (SCI) including resource allocation information for a second-stage SCI and data;
    transmitting, to a receiving terminal, the first-stage SCI on a physical sidelink control channel (PSCCH);
    transmitting, to the receiving terminal, the second-stage SCI in resources indicated by the resource allocation information; and
    transmitting, to the receiving terminal, the data on a physical sidelink shared channel (PSSCH) indicated by the resource allocation information, wherein the second-stage SCI and the data are multiplexed in the PSSCH, and
    wherein the resource allocation information includes information relatively indicating a time resource for the PSSCH based on a position of a resource for the first-stage SCI.

2. The method according to claim 1, wherein the first-stage SCI includes a resource allocation for another signal, further comprising receiving, from a base station, a higher layer message including an information element indicating a type of the another signal,
    wherein the information element indicates that the another signal comprises other first-stage SCI, other second-stage SCI, a single SCI, or other data.

3. The method according to claim 1, wherein the resource allocation information indicates an SCI occasion in which the second-stage SCI is transmittable or resources in which the second-stage SCI is transmitted within the SCI occasion.

4. The method according to claim 2, wherein the resource allocation information indicates an offset between resources in which the second-stage SCI is transmitted and resources in which the another signal is transmitted.

5. The method according to claim 4, wherein the offset is at least one of a time offset or a frequency offset, the time offset is set in units of symbols or slots, and the frequency offset is set in units of subcarriers or physical resource blocks (PRBs).

6. The method according to claim 2, wherein an offset between resources in which the second-stage SCI is transmitted and resources in which the another signal is transmitted is indicated by a higher layer message received from a base station, and the resource allocation information indicates whether to apply the offset.

7. The method according to claim 2, wherein when the another signal to be transmitted in resources indicated by the resource allocation information does not exist, the second-stage SCI includes an information element indicating release of the resources indicated by the resource allocation information.

8. The method according to claim 1, wherein the first-stage SCI, the second-stage SCI, and the data are transmitted in a same resource region, and the second-stage SCI and the data are multiplexed in the PSSCH belonging to the same resource region.

9. The method according to claim 1, wherein a resource region in which the first-stage SCI #n is transmitted is configured differently from a second resource region in which the second-stage SCI #n and the data are transmitted, and the second-stage SCI and the data are multiplexed in the PSSCH belonging to the second resource region.

10. A method of operating a receiving terminal in a communication system, the operation method comprising:
- receiving, from a transmitting terminal, a first-stage sidelink control information (SCI) including resource allocation information for a second-stage SCI and data;
- receiving, from the transmitting terminal, the second-stage SCI in resources indicated by the resource allocation information; and
- receiving, from the transmitting terminal, the data on a physical sidelink shared channel (PSSCH) indicated by the resource allocation information, wherein the second-stage SCI and the data are multiplexed in the PSSCH, and
- wherein the resource allocation information includes information relatively indicating a time resource for the PSSCH based on a position of a resource for the first-stage SCI.

11. The method according to claim 10, wherein the first-stage SCI is received by performing a blind decoding operation, and the second-stage step SCI is received without performing a blind decoding operation.

12. The method according to claim 10, wherein the first-stage SCI includes a resource allocation for another signal,
- further comprising receiving, from a base station, a higher layer message including an information element indicating a type of the another signal,
- wherein the information element indicates that the another signal comprises other first-stage SCI, other second-stage SCI, a single SCI, or other data.

13. The method according to claim 12, wherein when the another signal to be transmitted in resources indicated by the resource allocation information does not exist, the second-stage SCI includes an information element indicating release of the resources indicated by the resource allocation information.

14. The method according to claim 10, wherein the resource allocation information indicates an offset between resources in which the second-stage SCI is transmitted and resources in which the another signal is transmitted, the offset is at least one of a time offset or a frequency offset, the time offset is set in units of symbols or slots, and the frequency offset is set in units of subcarriers or physical resource blocks (PRBs).

15. A transmitting terminal in a communication system, the transmitting terminal comprising:
- a transceiver; and
- a processor coupled to the transceiver and configured to:
- generate a first-stage sidelink control information (SCI) including resource allocation information for a second-stage SCI and data;
- transmit, to a receiving terminal, the first-stage SCI on a physical sidelink control channel (PSCCH);
- transmit, to the receiving terminal, the second-stage SCI in resources indicated by the resource allocation information; and
- transmit, to the receiving terminal, the data on a physical sidelink shared channel (PSSCH) indicated by the resource allocation information,
- wherein the second-stage SCI and the data are multiplexed in the PSSCH, and
- wherein the resource allocation information includes information relatively indicating a time resource for the PSSCH based on a position of a resource for the first-stage SCI.

* * * * *